(12) United States Patent
Nara et al.

(10) Patent No.: US 7,281,209 B2
(45) Date of Patent: Oct. 9, 2007

(54) METHOD AND APPARATUS FOR MANAGING NUMBERING OF PRINT PAGES OF SECTIONS WITHIN A DOCUMENT

(75) Inventors: Shigeo Nara, Kanagawa (JP); Koji Nakagiri, Kanagawa (JP); Yasuo Mori, Kanagawa (JP); Takuya Miyazato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 585 days.

(21) Appl. No.: 10/241,571

(22) Filed: Sep. 12, 2002

(65) Prior Publication Data

US 2003/0056174 A1 Mar. 20, 2003

(30) Foreign Application Priority Data

Sep. 14, 2001 (JP) ............................. 2001-280606

(51) Int. Cl.
*G06F 15/00* (2006.01)

(52) U.S. Cl. ...................... 715/517; 715/500; 715/539; 358/1.11; 358/1.13

(58) Field of Classification Search ........ 715/514–515, 715/517, 500, 526, 530, 539, 525; 358/1.11, 358/1.13, 1.18
See application file for complete search history.

(56) References Cited

U.S. PATENT DOCUMENTS

| | | | | |
|---|---|---|---|---|
| 5,051,930 A | * | 9/1991 | Kuwabara et al. | 715/516 |
| 5,503,435 A | * | 4/1996 | Kline | 283/67 |
| 5,583,659 A | * | 12/1996 | Lee et al. | 358/3.13 |
| 5,903,903 A | * | 5/1999 | Kennedy | 715/525 |
| 6,040,920 A | * | 3/2000 | Ichiriki | 358/403 |
| 6,462,725 B1 | * | 10/2002 | Orisaka | 345/98 |
| 6,462,756 B1 | | 10/2002 | Hansen et al. | 715/764 |
| 6,509,974 B1 | | 1/2003 | Hansen | 358/1.12 |
| 6,512,899 B2 | | 1/2003 | Shimada et al. | 399/82 |
| 6,538,760 B1 | * | 3/2003 | deBry et al. | 358/1.15 |
| 6,773,176 B2 | * | 8/2004 | Kurosawa | 400/76 |
| 6,825,943 B1 | | 11/2004 | Barry et al. | 358/1.15 |
| 7,019,854 B1 | * | 3/2006 | Sawano | 358/1.15 |

FOREIGN PATENT DOCUMENTS

| | | |
|---|---|---|
| JP | 8-249319 | 9/1996 |
| JP | 2000-181673 | 6/2000 |

OTHER PUBLICATIONS

Microsoft Word Printout, copyright 1999, pp. 1-37.*
Microsoft Word Printout (hereinafter Word), copyright 1999, pp. 1-47.*

(Continued)

*Primary Examiner*—Stephen Hong
*Assistant Examiner*—Thu Huynh
(74) *Attorney, Agent, or Firm*—Fitzpatrick, Cella, Harper & Scinto

(57) ABSTRACT

An object of the present invention is to provide a document processing apparatus and method capable of adding headers/footers to a plurality of sections of a document. Check boxes for definitions are checked on a plurality-of-definitions setting window. A document is sectioned into chapters by designating the first and last chapters. Page numbers can be assigned throughout each section, and the format of the page number can be set.

14 Claims, 22 Drawing Sheets

OTHER PUBLICATIONS

OmniPage Pro Printout (hereinafter OmniPage Pro), pp. 1-7, copyright 1999.*
U.S. Appl. No. 09/699,389, filed Oct. 31, 2000.
U.S. Appl. No. 10/238,693, filed Sep. 11, 2002.
U.S. Appl. No. 10/241,633, filed Sep. 12, 2002.
U.S. Appl. No. 10/241,704, filed Sep. 12, 2002.

* cited by examiner

FIG. 4A

| NO | ATTRIBUTE INFORMATION | | REMARKS |
|---|---|---|---|
| 1 | PRINTING METHOD | SINGLE-SIDED / DOUBLE-SIDED / BOOKBINDING PRINTING | |
| 2 | PAPER SIZE | ORIGINAL SIZE / FIXED SIZE | • Z-FOLD IS DESIGNATED WHEN "A4 + A3", "B4 + B3", OR "LETTER + LEDGER (11 × 17)" IS DESIGNATED<br>• ORIGINAL SIZE OF FIRST CHAPTER / PAGE IS AUTOMATICALLY SELECTED WHEN BOOKBINDING PRINTING OR N-up PRINTING IS DESIGNATED |
| 3 | PAPER DIRECTION | PORTRAIT / LANDSCAPE | • SELECTABLE ONLY FOR FIXED SIZE |
| 4 | BINDING MARGIN / BINDING DIRECTION | | • SHIFT / ENLARGEMENT & REDUCTION CAN BE DESIGNATED |
| 5 | N-up PRINTING | NUMBER OF PAGES / LAYOUT ORDER / BOUNDARY / LAYOUT POSITION, etc. | • LAYOUT POSITION : NINE PATTERNS<br>• X1 PRINTING CAN BE DESIGNATED |
| 6 | ENLARGEMENT / REDUCTION | ON / OFF | ON / OFF CAN BE AUTOMATICALLY DESIGNATED WHEN PAPER SIZE IS FIXED SIZE OR N-up PRINTING IS SELECTED |
| 7 | WATERMARK | | • WATERMARK CAN BE DESIGNATED INDIVIDUALLY IN LOGICAL OR PHYSICAL PAGES<br>• ALL CHAPTERS / PAGES ARE TARGETED |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES<br>• ALL CHAPTERS/PAGES ARE TARGETED |
| 9 | DISCHARGE METHOD | STAPLE/PUNCH HOLE | • STAPLING/PUNCHING ONLY IN SINGLE-/DOUBLE-SIDED PRINTING<br>• STAPLING AT ONE/TWO POSITIONS |
| 10 | DETAILS OF BOOKBINDING | OPENING DIRECTION/SADDLE STITCH/ENLARGEMENT & REDUCTION DESIGNATION/BINDING MARGIN/FASCICLE DESIGNATION, etc. | • ONLY IN BOOKBINDING PRINTING |
| 11 | FRONT/BACK COVER | | • PRINTING IS DESIGNATED FOR 1/2 FRONT COVER OR 1/2 BACK COVER<br>• FEED PORT (INCLUDING INSERTER) IS DESIGNATED |
| 12 | INDEX SHEET | | • PRINTING OF CHARACTER STRING ON INDEX PORTION OR ANNOTATION ON INDEX SHEET CAN BE SET<br>• BOOKBINDING CANNOT BE DESIGNATED |
| 13 | SLIP SHEET | | • FEED PORT (INCLUDING INSERTER) IS DESIGNATED<br>• ORIGINAL DATA CAN BE PRINTED ON INSERTED PAPER<br>• BOOKBINDING CANNOT BE DESIGNATED |
| 14 | CHAPTERING | "NONE"/"PAGE BREAK"/"PAPER CHANGE" | • "PAPER CHANGE" IS FIXED WHEN INDEX SHEET OR SLIP SHEET IS DESIGNATED<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | ORIGINAL SIZE / FIXED SIZE | · "PAPER CHANGE" IS AUTOMATICALLY DESIGNATED WHEN FIXED SIZE IS SELECTED<br>· WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK |
| 2 | PAPER DIRECTION | PORTRAIT / LANDSCAPE | · SELECTABLE ONLY FOR FIXED SIZE |
| 3 | N-up PRINTING | NUMBER OF PAGES / LAYOUT ORDER / BOUNDARY / LAYOUT POSITION, etc. | · LAYOUT POSITION : NINE PATTERNS<br>· X1 PRINTING CAN BE DESIGNATED |
| 4 | ENLARGEMENT / REDUCTION | ON / OFF | · ON / OFF CAN BE AUTOMATICALLY DESIGNATED WHEN PAPER SIZE IS FIXED SIZE OR N-up PRINTING IS SELECTED |
| 5 | WATERMARK | DISPLAY / NON-DISPLAY | · WHETHER TO DISPLAY ALL WATERMARKS DESIGNATED BY BOOK IS DESIGNATED |
| 6 | HEADER / FOOTER | DISPLAY / NON-DISPLAY | · WHETHER TO DISPLAY ALL HEADERS / FOOTERS DESIGNATED BY BOOK IS DESIGNATED |
| 7 | DISCHARGE METHOD | STAPLE | · STAPLE CAN BE SET OFF WHEN STAPLE IS DESIGNATED BY BOOK. DEFAULT VALUE IS "ON" |

FIG. 6

| NO | ATTRIBUTE INFORMATION | | REMARKS |
|----|----|----|----|
| 1 | PAGE ROTATION DESIGNATION | | • 0°/90°/180°/270° CAN BE DESIGNATED |
| 2 | WATERMARK | DISPLAY / NON-DISPLAY | • WHETHER TO DISPLAY ALL WATERMARKS DESIGNATED BY BOOK IS DESIGNATED |
| 3 | HEADER / FOOTER | DISPLAY / NON-DISPLAY | • WHETHER TO DISPLAY ALL HEADERS / FOOTERS DESIGNATED BY BOOK IS DESIGNATED |
| 4 | ZOOM | 50% - 200% | • MAGNIFICATION RELATIVE TO SIZE WHICH IS FIT IN VIRTUAL LOGICAL PAGE REGION AND SET AS 100% IS DESIGNATED |
| 5 | LAYOUT POSITION | | • NINE FIXED PATTERNS AND ARBITRARY POSITION CAN BE DESIGNATED |
| 6 | ANNOTATION | | |
| 7 | VARIABLE ITEM | | |
| 8 | PAGE DIVISION | | |

FIG. 16

| Details of Print Header / Footer | | | ? X |
|---|---|---|---|
| Header | Footer | | |

Left:  Center:  Right:

Font: MS P Mincho
Size: 7 Points
Color: 50% Gray

1601 — Serial Number: Serial Numbering throughout Document    Insert Standard Expression ◀— 1605
Designate Start Chapter Number:
1602 — Number Format: 1, 2, 3…
1603 — ☐ No Page Number on Cover                Set Plurality of Definitions
1604 — ☐ No Page Number on Start Page of Chapter OK    Cancel    Help(H)

Details of Print Header / Footer

Header | Footer

Left: | Center: | Right:

Font: MS Gothic
Size: 10 Points
Color:

Serial Number: Serial Numbering throughout Document — 1901
Designate Start Chapter Number: 1
Number Format: 1, 2, 3...

☐ No Page Number on Cover — 1903
☐ No Page Number on Start Page of Chapter

OK

— 1601

Set Plurality of Definitions — 1906

Set Plurality of Definitions — 1902

☑ Definition 1: 1 Chapter~ 2 Chapter~ — 1907, 1908
Number Format: i, ii, iii...

☑ Definition 2: 3 Chapter~ 6 Chapter~
Number Format: 1, 2, 3...

☑ Definition 3: 7 Chapter~ 8 Chapter~
Number Format: 1, 2, 3...

— 1904
— 1905

OK | Cancel | Help(H)

METHOD AND APPARATUS FOR MANAGING NUMBERING OF PRINT PAGES OF SECTIONS WITHIN A DOCUMENT

FIELD OF THE INVENTION

The present invention relates to a document processing apparatus and method which combine, into one document, output data generated by various programs such as a document processing program and image editing program, and provide an editing function for the document.

BACKGROUND OF THE INVENTION

Different types of data such as characters, tables, and images require different structures which define the data and different editing operations for the data. Various application programs are provided in accordance with the type of data. The user uses different applications for different types of data: a character processing program in order to edit characters, a spreadsheet program in order to edit tables, and an image editing program in order to edit images.

In this way, the user generally uses different application programs for different types of data. In general, a document to be created by the user is made up of a plurality of types of data such as characters and tables, or characters and images, rather than a document formed from only one type of data such as characters, tables, or images. To create a target document containing a plurality of types of data, the user must use the printing functions of various applications to print data by the respective applications, and combine the print materials in a desired order.

Some programs such as so-called "Office Suite" which forms one integrated application from various applications provide a function of combining data generated by respective applications into one document. The use of the integrated application allows the user to combine data created by respective applications into one target document by using a specific application included in the integrated application.

However, to assign page numbers to pages when the user creates one target document by combining print materials generated by various applications, he/she must print out all necessary data, combine them into a document, and determine page numbers. Each application writes determined page numbers on respective pages (to be referred to as logical pages or original pages) of an original created by the application. Even if the application program has a function of assigning page numbers, the page numbers of discontinuous pages must be designated by the user. If the pages of the target document are rearranged, page numbers must be reassigned in accordance with the rearrangement. These pages must also be edited and printed again by an application when not data contents but merely the format is changed such that a plurality of original pages are combined into one page (to be referred to as a physical page or print page) as a print material, or single-sided printing is changed to double-sided printing.

Since an application which can manage data changes depending on the type of data, the user must manually provide an interface between applications. This means that much labor is demanded of the user, decreasing the productivity. The many manual operations readily generate errors.

The use of an integrated application for creating a target document enables arranging various data in the data state without printing them out. No heavy labor is required in comparison with creation of a target document by combining print materials. However, applications for editing and creating various data are restricted to ones included in the integrated application, so a user-desired application is not always exploited. A target document created by the integrated application is one document file, and management such as editing and output is done for each file. The application function poses many constraints on setting the format of part of the document file. For example, the user must change format settings at each portion where the format is changed, and print the target page again. This leads to enormous labor and low productivity, similar to the above-mentioned method.

As for a header/footer often added to a document, to change the format of the header/footer or reassign a page number included in the header/footer at the middle of the document, the user must designate the format or page number, and print each portion to which the designation is applied. Even an integrated application having a function of breaking a document and designating a header/footer must search an open document file for a break portion, and set the break and desired designation contents.

SUMMARY OF THE INVENTION

The present invention has been made in consideration of the above situation, and has as its object to provide a document processing apparatus and method which enable designating a header/footer at each of breaks in one document, and facilitate designating the header/footer.

It is another object of the present invention to provide a document processing apparatus and method which enable creating and editing a document made up of data created by user-desired application programs, and increase the operability and document editing productivity.

To achieve the above objects, the present invention has the following arrangement.

There is provided a document processing apparatus which has a hierarchical structure whose minimum unit is an original page, and edits and processes document data having an attribute set in each hierarchical layer, comprising designation means for sectioning a document into a plurality of sections by using as a unit a set belonging to a predetermined hierarchical layer of the hierarchical structure, and designating addition of a page number for each section, and image forming means for forming an image obtained by adding the page number to either of a print page and an original page in accordance with designation by the designation means.

The designation means can preferably designate three sections at maximum, and designate a font of the page number for each section.

The designation means can preferably set, in an attribute of an uppermost hierarchical layer of the hierarchical structure, designation of adding page numbers to the original page and the print page, and set, in an attribute of a hierarchical layer lower than the uppermost hierarchical layer, whether the designation of adding page numbers complies with a setting on an immediately upper hierarchical layer.

When the designation of adding page numbers is set in the attribute of the lower hierarchical layer not to comply with the setting on the immediately upper hierarchical layer, the designation means can preferably designate addition of a page number to each page by using as a unit a set on the hierarchical layer.

The hierarchical structure preferably includes a structure in which original pages, chapters formed from the original pages, and document data formed from the chapters are sequentially stacked as upper hierarchical layers, and the unit used to section the document preferably includes a chapter.

The document processing apparatus preferably further comprises conversion means for converting data created by an application into a format of the document data.

The document processing apparatus preferably further comprises output means for outputting each print page formed by the image forming means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 16 is a view showing a header/footer editing window;

FIG. 19 is a view showing a header/footer editing (a plurality of sections) window;

DETAILED DESCRIPTION OF THE PREFERRED EMBODIMENT

First Embodiment

<General Description of System>

A document processing system according to the first embodiment suited to an information processing system of the present invention will be generally described with reference to FIGS. 1 to 12. This document processing system converts a data file created by a general application into an electronic original file by an electronic original writer. A bookbinding application provides a function of editing the electronic original file. Details of the system will be explained below.

<System Configuration and Operation>

Figure 1:
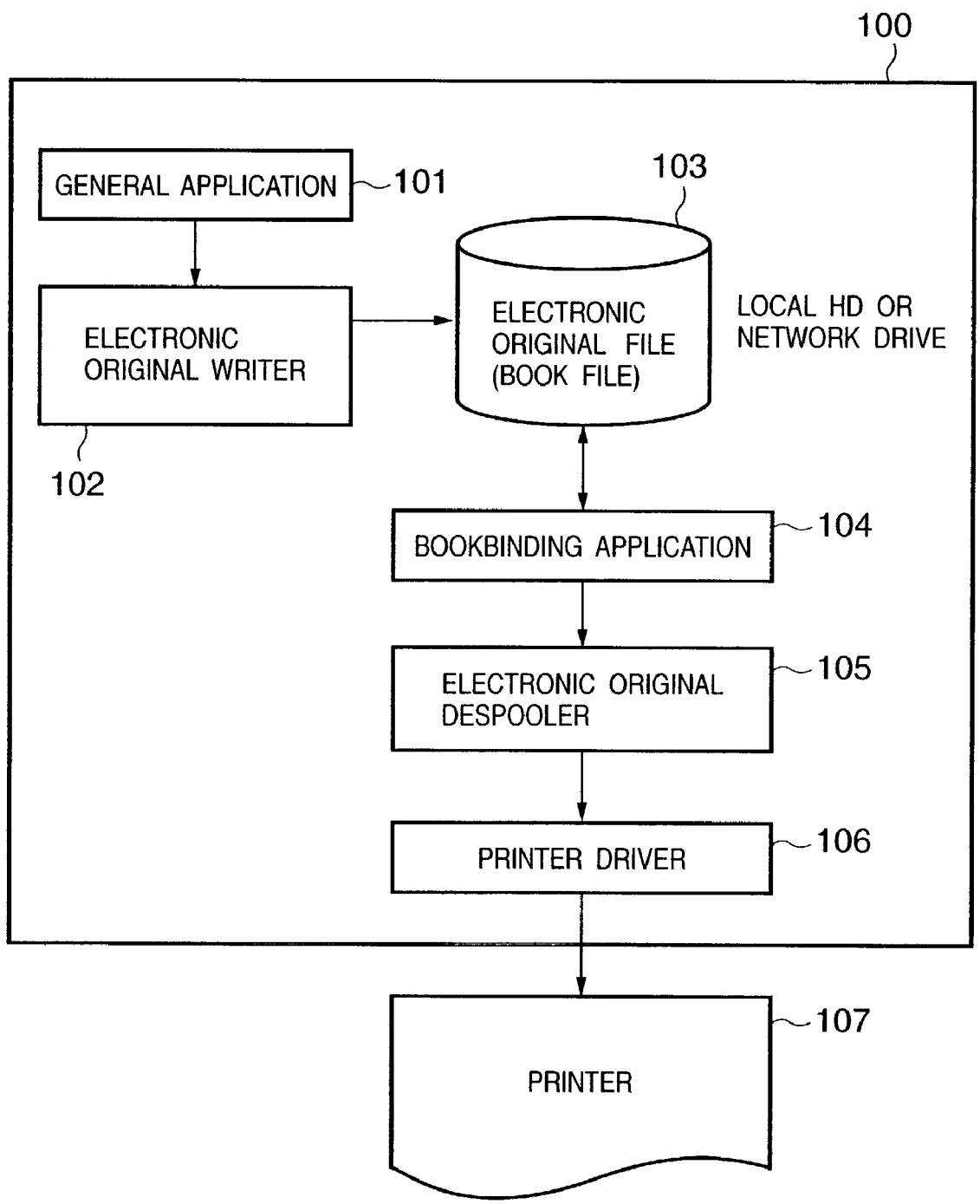
FIG. 1 is a block diagram showing a stand-alone document processing system.

FIG. 1 is a block diagram showing the software structure of the document processing system according to this embodiment. The document processing system is implemented by a digital computer 100 (to be also referred to as a host computer hereinafter) as an embodiment suited to the information processing apparatus of the present invention. A general application 101 is an application program which provides functions such as wordprocessing, spreadsheet, photo-retouch, draw, paint, presentation, and text editing. The general application 101 has a printing function corresponding to the OS. Such applications utilize a predetermined interface (generally called GDI) provided by the OS (Operating System) in printing application data such as created document data or image data. To print created data, the general application 101 transmits an output command (called a GDI function) which is determined in advance for the output module of the OS providing the interface and has an OS-dependent format. The output module which has received the output command converts the command into a format processable by an output device such as a printer, and outputs the converted command (called a DDI function). Since the format processable by the output device changes depending on the type of device, the manufacturer, and the model, a device driver is provided for each device. The OS converts a command by using the device driver, generates print data, and combines print data by JL (Job Language) to generate a print job. When the OS is Microsoft Windows, the output module is a GDI module.

An electronic original writer 102 is an improvement of the device driver, and is a software module provided to implement the document processing system. The electronic original writer 102 does not target a specific output device, and converts an output command into a format processable by a bookbinding application 104 or printer driver 106 (to be described later). The format (to be referred to as an electronic original format hereinafter) converted by the electronic original writer 102 is not particularly limited as far as each original page can be expressed by a detailed format. Of substantial standard formats, for example, the PDF format by Adobe Systems and the SVG format can be adopted as electronic original formats. When the application 101 utilizes the electronic original writer 102, the electronic original writer 102 is designated as a device driver used for output, and then caused to execute printing. An electronic original file created by the electronic original writer 102 does not have a complete electronic original file format. For this reason, the electronic original writer 102 is designated as a device driver by the bookbinding application 104, and executes conversion of application data into an electronic original file under the management of the bookbinding application 104. The bookbinding application 104 completes a new incomplete electronic original file generated by the electronic original writer 102 as an electronic original file having the following format. In case of necessity to definitely discriminate these files, a file created by the electronic original writer 102 will be called an electronic original file, and an electronic original file given a structure by the bookbinding application will be called a book file. If these files need not be particularly discriminated, a document file generated by an application, an electronic original file, and a book file are called document files (or document data).

As described above, the electronic original writer 102 is designated as a device driver, and the general application 101 prints the data. Application data is converted into an electronic original format in pages (to be referred to as logical pages or original pages hereinafter) defined by the application 101. The converted data is stored as an electronic original file 103 in a storage medium such as a hard disk. The hard disk may be the local drive of the computer which implements the document processing system of this embodiment, or when the computer is connected to a network, may be a drive provided on the network.

The bookbinding application 104 provides the user with a function of loading and editing the electronic original file or book file 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic original despooler 105. The electronic original despooler 105 is a program module installed into the computer together with the bookbinding application. The electronic original despooler 105 is a module used to output drawing data to a printer driver in printing a document (book file) used by the bookbinding application. The electronic original despooler 105 reads out a designated book file from the hard disk. To print each page in a format described in the book file, the electronic original despooler 105 generates an output command complying with the output module of the OS described above, and outputs the command to the output module (not shown). At this time, the printer driver 106 of a printer 107 used as an output device is designated as a device driver. The output module converts the output command received using the designated printer driver 106 of the printer 107 into a device command interpretable by the printer 107. The device command is transmitted to the printer 107, which prints an image corresponding to the command.

Figure 2:
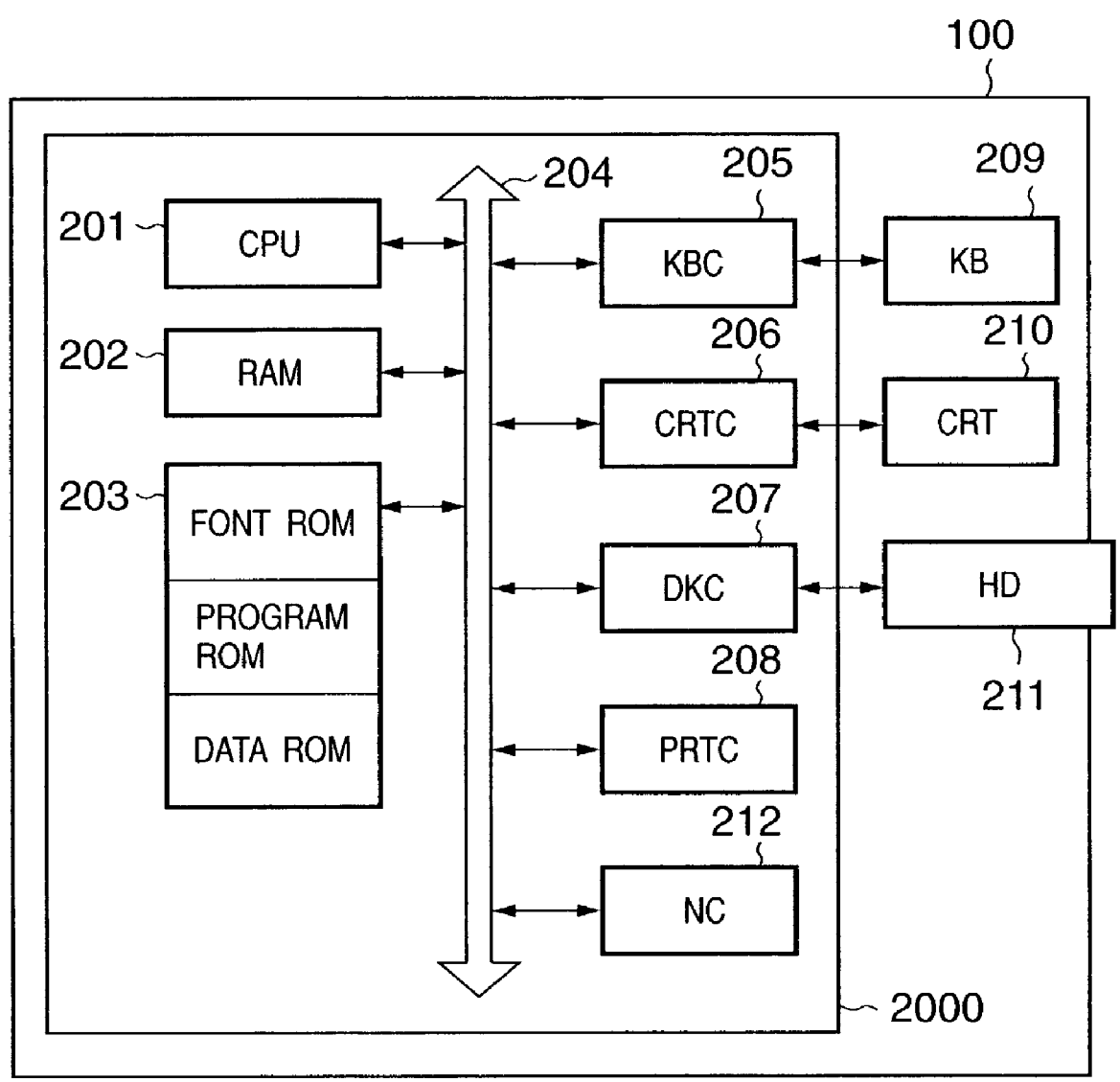
FIG. 2 is a block diagram showing a computer which implements the document processing system.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and realizes the software structure in FIG. 1 or flow chart procedures (to be described later). The RAM 202 functions as the main memory or work area of the CPU 201. A keyboard controller (KBC) 205 controls a key input from a keyboard 209 or a pointing device (not shown). A CRT controller (CRTC) 206 controls the display on a CRT display 210. A disk controller (DKC) 207 controls access to the hard disk (HD) 211 or floppy disk (FD) which stores a boot program, various applications, font data, user files, editing files (to be described later), and the like. A PRTC 208 controls signal exchange with the connected printer 107. An NC 212 is connected to a network, and executes communication control processing with another device connected to the network.

<Electronic Original Data Format>

Before the bookbinding application 104 is described in detail, the book file data format will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may include a plurality of chapters, and one chapter may include a plurality of pages.

Figure 3A:
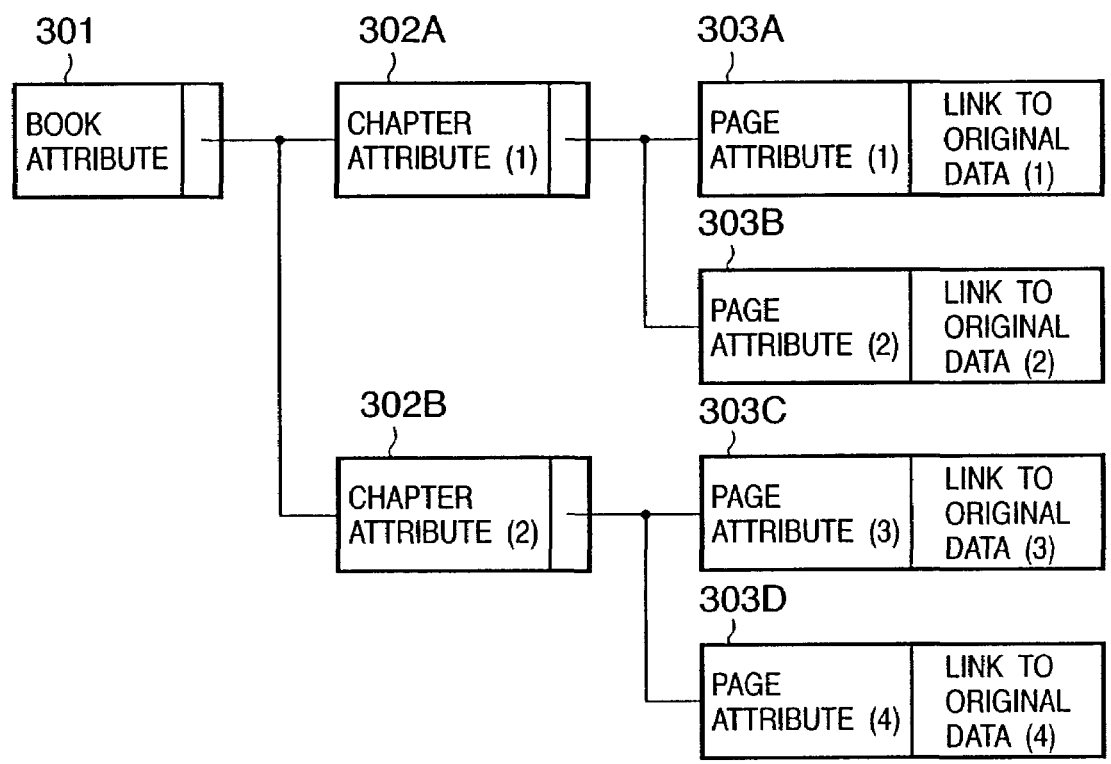
FIGS. 3A and 3B are views showing an example of a book file structure.

FIG. 3A is a block diagram schematically showing an example of the book file format. In the book file of this example, a book, chapter, and page are represented by corresponding nodes. One book file includes one book. The book and chapter are a concept for defining a book structure, and contain, as entities, defined attribute values and links to lower layers. The page has, as an entity, data of each page output from an application program. In addition to an attribute value, the page contains the entity of an original page (original page data) and a link to each original page data. In some cases, a print page to be output onto a paper medium or the like includes a plurality of original pages. This structure is displayed not by a link but by an attribute in the book, chapter, or page layer.

Figure 3B:
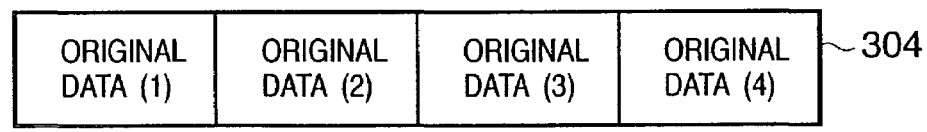

In FIGS. 3A and 3B, a book 301 defines a book attribute, and is linked to two chapters 302A and 302B. These links display that the chapters 302A and 302B are included in the book 301. The chapter 302A is linked to pages 303A and 303B, which represents that the chapter 302A includes these pages. The pages 303A and 303B define attribute values, and contain links to original page data (1) and (2) serving as entities. These links represent data (1) and (2) of original page data 304 shown in FIG. 3B, and display that the entities of the pages 303A and 303B are original page data (1) and (2).

FIGS. 4A and 4B show lists of book attributes. As for an item which can be defined repetitively on a lower layer, the attribute value of the lower layer is preferentially adopted. As for an item contained in only the book attribute, a value defined in the book attribute is effective over the book. An item repetitively defined on a lower layer is a default value used when this item is not defined in the lower layer. Each item shown in FIGS. 4A and 4B does not always correspond to one concrete item, but may contain a plurality of relevant items.

FIG. 5 shows a list of chapter attributes, and FIG. 6 shows a list of page attributes. The relationship between chapter attributes and page attributes is the same as that between book attributes and lower layer attributes.

Items unique to book attributes are six items: printing method, details of bookbinding, front/back cover, index sheet, slip sheet, and chaptering. These items are defined over the book. As printing method attributes, three values: single-sided printing, double-sided printing, and bookbinding printing can be designated. Bookbinding printing is a method of printing data in a format which allows bookbinding by bundling a separately designated number of paper sheets, folding the bundle into two, and binding the bundle. As detailed bookbinding attributes, the opening direction and the number of paper sheets to be bundled can be designated when bookbinding printing is designated.

The front/back cover attribute includes designation of adding paper sheets serving as front and back covers when an electronic original file combined as a book is printed, and designation of contents to be printed on the added paper sheets. The index sheet attribute includes designation of inserting a deckle-edged index sheet separately prepared in a printing apparatus for chaptering, and designation of contents to be printed on the index (deckle-edged) sheet. This attribute becomes effective when a printing apparatus to be used is equipped with an inserter having an inserting function of inserting a paper sheet prepared separately from a print paper sheet into a desired position, or when a plurality of sheet cassettes can be used. This also applies to the slip sheet attribute.

The slip sheet attribute includes designation of inserting a paper sheet fed from an inserter or sheet feed cassette for chaptering, and designation of a sheet feed source when a slip sheet is inserted.

The chaptering attribute includes designation of whether to use a new paper sheet, use a new print page, or do nothing particular at a chapter break. In single-sided printing, the use of a new paper sheet and the use of a new print page are the same. In double-sided printing, a continuous chapter is not printed on one paper sheet if "the use of a new paper sheet" is designated, but may be printed on the upper and lower surfaces of one paper sheet if "the use of a new print page" is designated.

As for the chapter attribute, there is no item unique to the chapter, and all items overlap those of the book attribute. If the definition of the chapter attribute is different from that of the book attribute, a value defined by the chapter attribute precedes. Items common to only the book and chapter attributes are five items: paper size, paper direction, N-up printing designation, enlargement/reduction, and discharge method. The N-up printing designation attribute is an item for designating the number of original pages included in one print page. Layouts which can be designated are 1×1, 1×2, 2×2, 3×3, 4×4, and the like. The discharge method attribute is an item for designating whether to staple discharged paper sheets. The effectiveness of this item depends on whether the printing apparatus has a staple function.

Items unique to the page attribute are a page rotation attribute, zoom, layout designation, annotation, and page division. The page rotation attribute is an item for designating the rotation angle when an original page is laid out on a print page. The zoom attribute is an item for designating the zoom ratio of an original page. The zoom ratio is designated based on a virtual logical page region size=100%. The virtual logical page region is a region occupied by one original page when original pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header and footer are watermarks printed at the upper and lower margins of each page. For the header and footer, items such as a page number, and time and date which can be designated by variables are prepared. Contents which can be designated by the watermark attribute and header/footer attribute are common to the chapter and page, but are different in the book. The book can set the contents of the watermark and header/footer, and designate how to print a watermark or header/footer throughout the book. To the contrary, the chapter and page can designate whether to print a watermark or header/footer set by the book on the chapter or page.

<Book File Generation Procedures>

Figure 7:
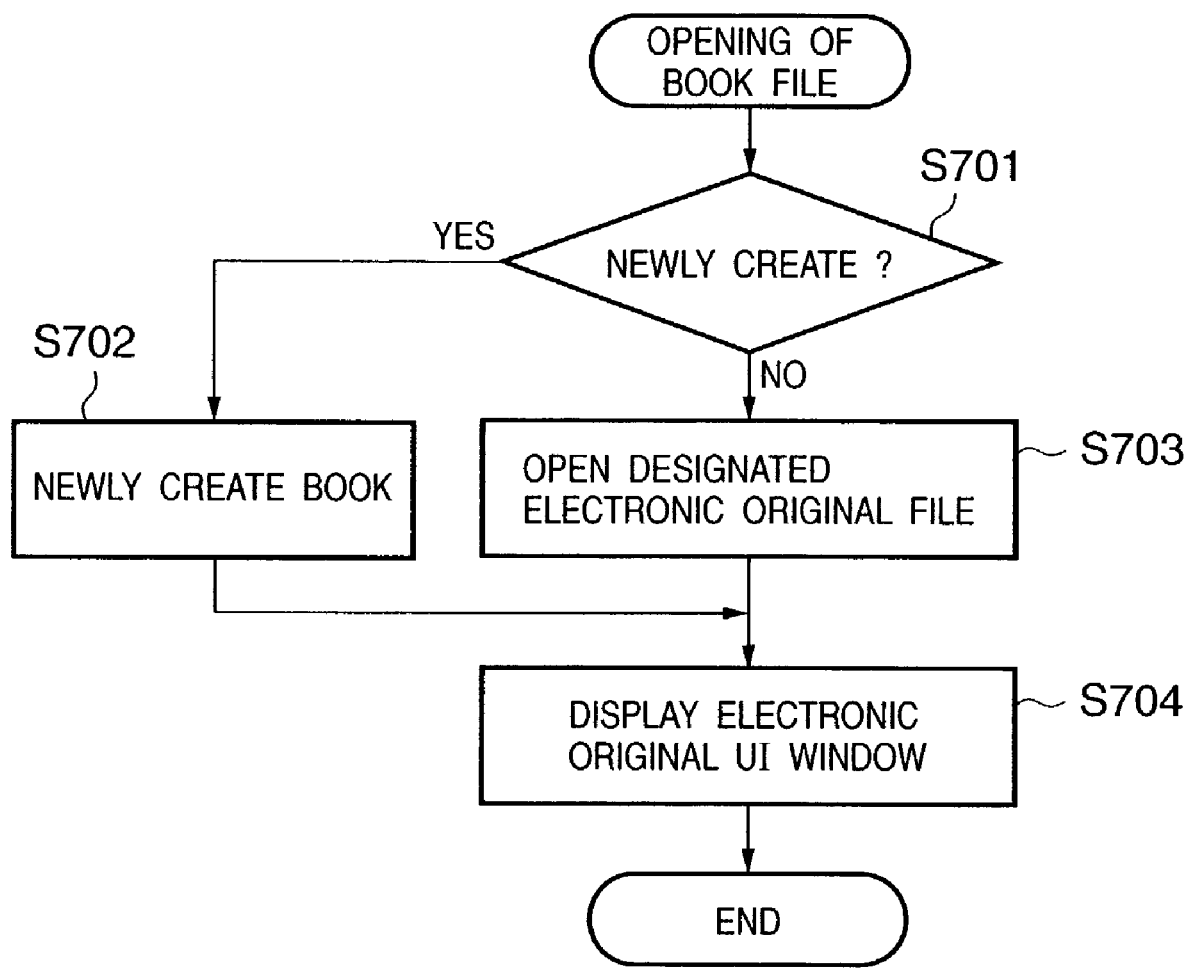
FIG. 7 is a flow chart showing procedures of opening a book file.

The book file has the above-described structure and contents. Procedures of creating a book file by the bookbinding application 104 and electronic original writer 102 will be explained. Creation of a book file is realized as part of book file editing operation by the bookbinding application 104. FIG. 7 shows procedures when the bookbinding application 104 opens a book file.

Figure 11:
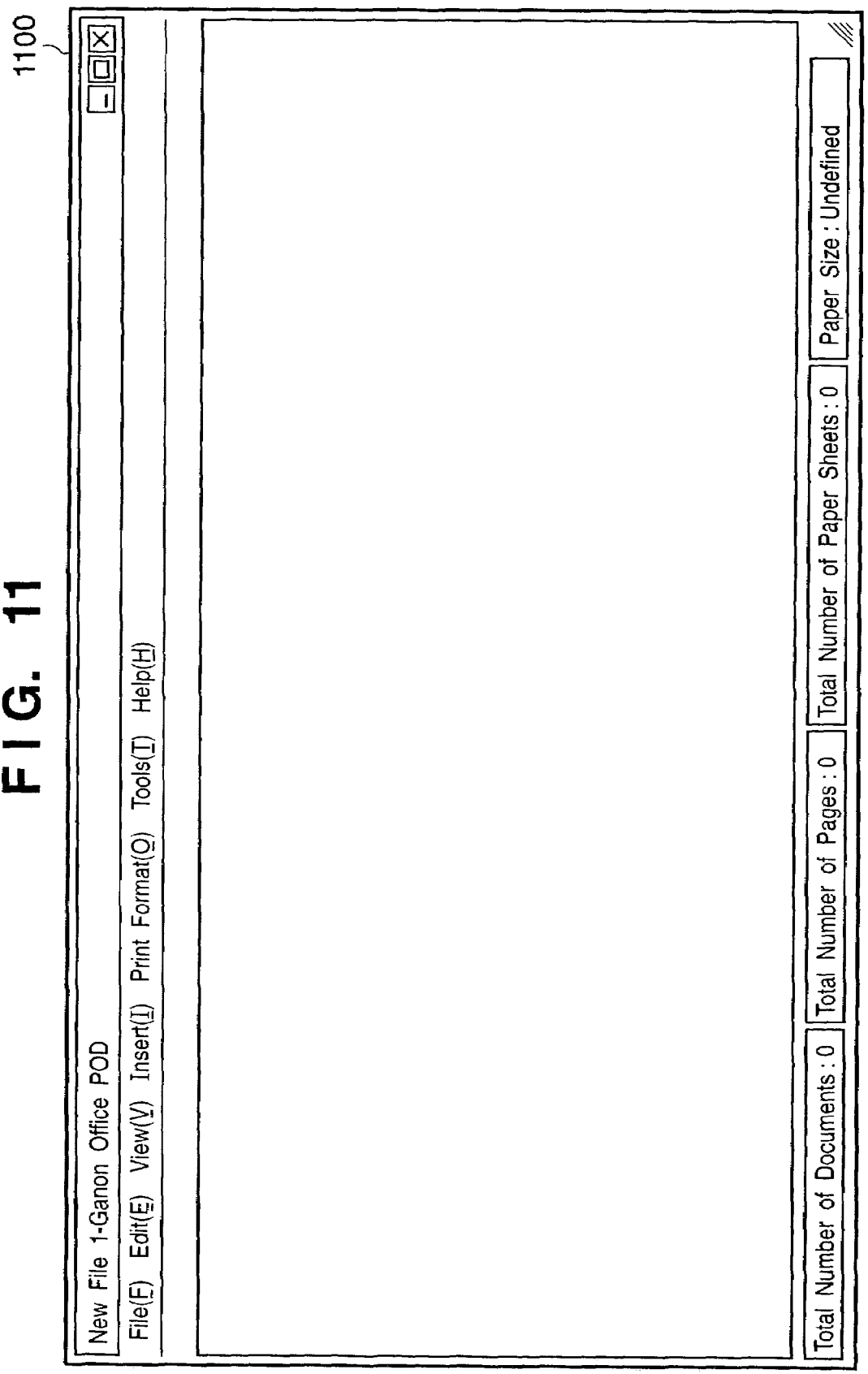
FIG. 11 is a view showing an example of a user interface window when a new book file is opened.

Whether a book file to be opened is one to be newly created or an existing one is checked (step S701). If YES in step S701, a book file including no chapter is newly created (step S702). In the example shown in FIGS. 3A and 3B, the newly created book file is a book node which has only the book node 301 without any link to a chapter node. As the book attribute, a set of attributes prepared in advance for creation of a new book file are applied. Then, a UI (User Interface) window for editing the new book file is displayed (step S704). FIG. 11 shows an example of the UI window when a book file is newly created. In this case, a UI window 1100 does not display any information because the book file does not have any substantial content.

Figure 10:
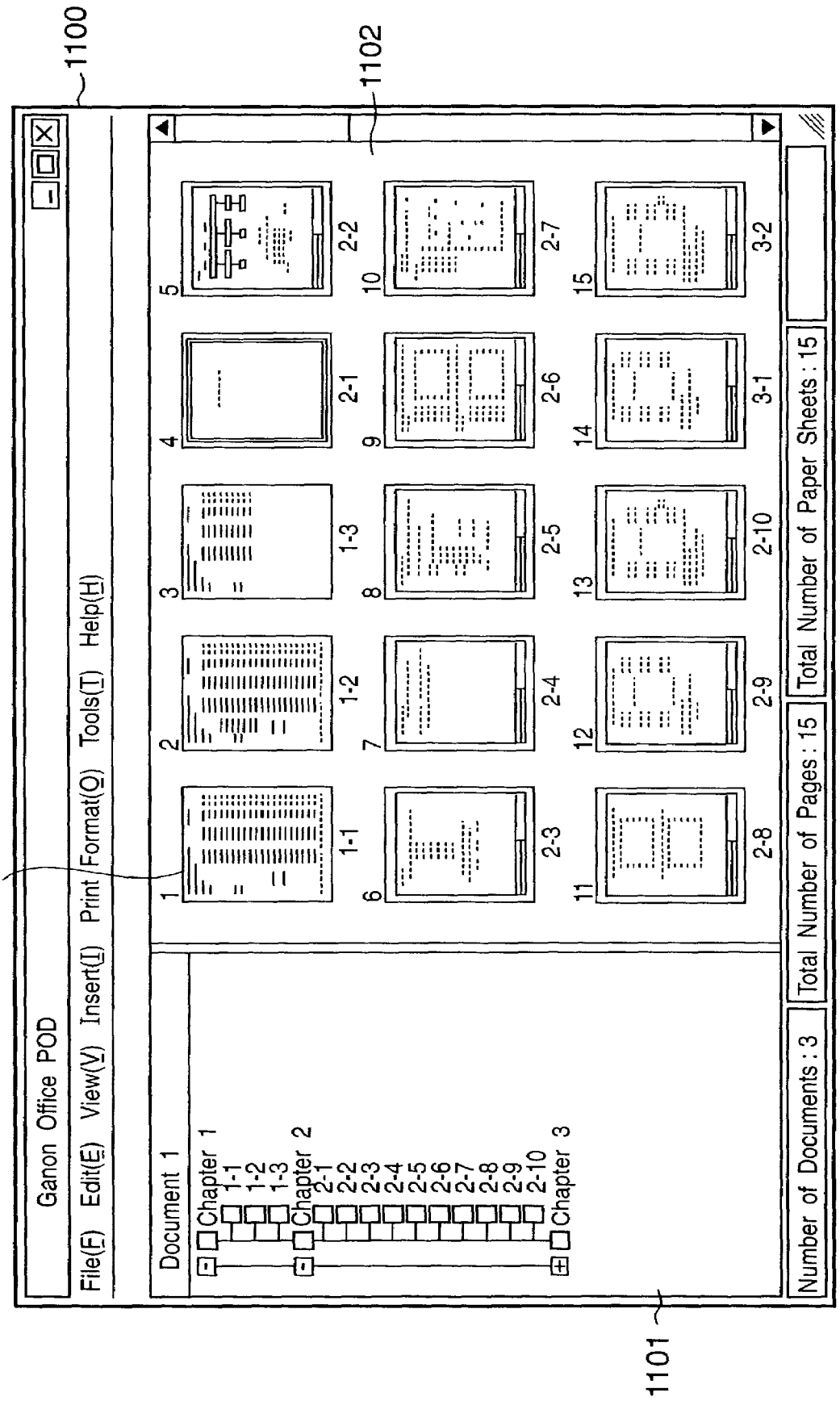
FIG. 10 is a view showing an example of a user interface window when an existing book file is opened.

If NO in step S701, a designated book file is opened (step S703), and a UI (User Interface) window is displayed in accordance with the structure, attribute, and contents of the book file. FIG. 10 shows an example of the UI window. The UI window 1100 has a tree portion 1101 representing a book structure, and a preview portion 1102 displaying a state to be printed. The tree portion 1101 displays chapters included in the book and pages included in each chapter by a tree structure as shown in FIG. 3A. Pages displayed at the tree portion 1101 are original pages. The preview portion 1102 displays reduced print page contents. The display order reflects the book structure.

Figure 8:
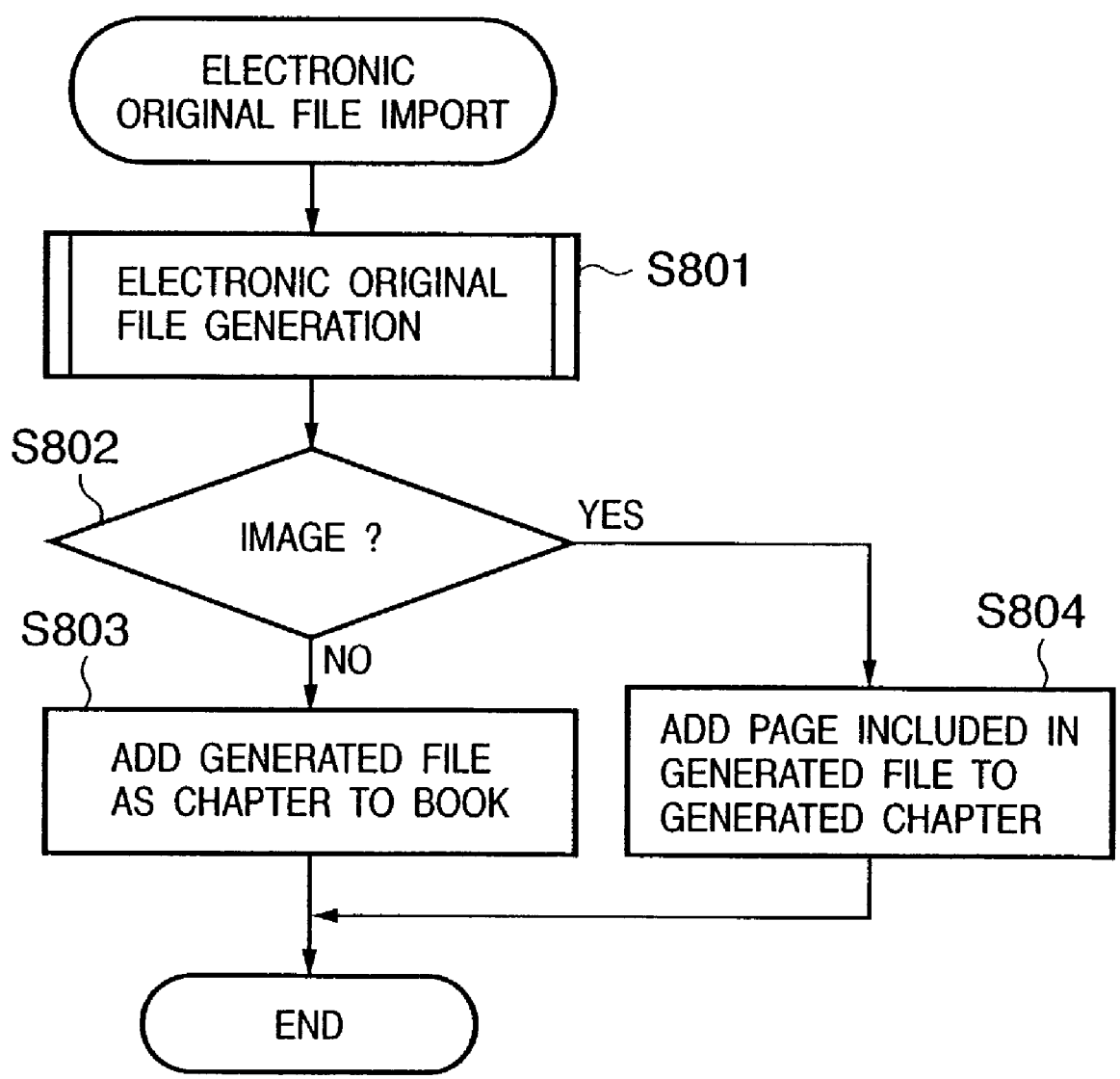
FIG. 8 is a flow chart showing procedures of importing an electronic original file into a book file.

Application data converted into an electronic original file by the electronic original writer can be added as a new chapter to the open book file. This function is called an electronic original import function. An electronic original is imported to the book file newly created by the procedures of FIG. 7, thereby giving an entity to the book file. This function is activated by drag-and-drop operation of application data to the window of FIG. 10. FIG. 8 shows electronic original import procedures.

An application program which has generated designated application data is activated. The electronic original writer 102 is designated as a device driver, and prints out application data to convert it into electronic original data (step S801). After conversion, whether the converted data is image data is checked (step S802). This determination can be achieved based on the file extension of the application under the Windows OS. For example, an extension "bmp" represents Windows bitmap data; "jpg", jpeg-compressed image data; and "tiff", tiff-format image data. If YES in step S802, processing in S801 can be skipped because an electronic original file can be directly generated from image data without activating an application in S801.

If NO in step S802, the electronic original file generated in step S801 is added as a new chapter to the book of a currently open book file (step S803). As for the chapter attribute, an attribute common to a book attribute is set to a book attribute value, and a different attribute is set to a default value prepared in advance.

If YES in step S802, no new chapter is added in principle, and each original page included in the electronic original file generated in step S801 is added to a designated chapter (step S804). For a file in which a book file is newly created, a new chapter is created, and each page of the electronic original file is added as a page belonging to the chapter. As for the page attribute, an attribute common to an upper layer attribute is given the attribute value of the upper layer attribute, and an attribute which is defined in application data and inherited to the electronic original file is given a value defined in the application data. For example, when N-up designation is defined in application data, the page inherits this attribute value. In this way, a new book file is created, or a new chapter is added.

Figure 9:
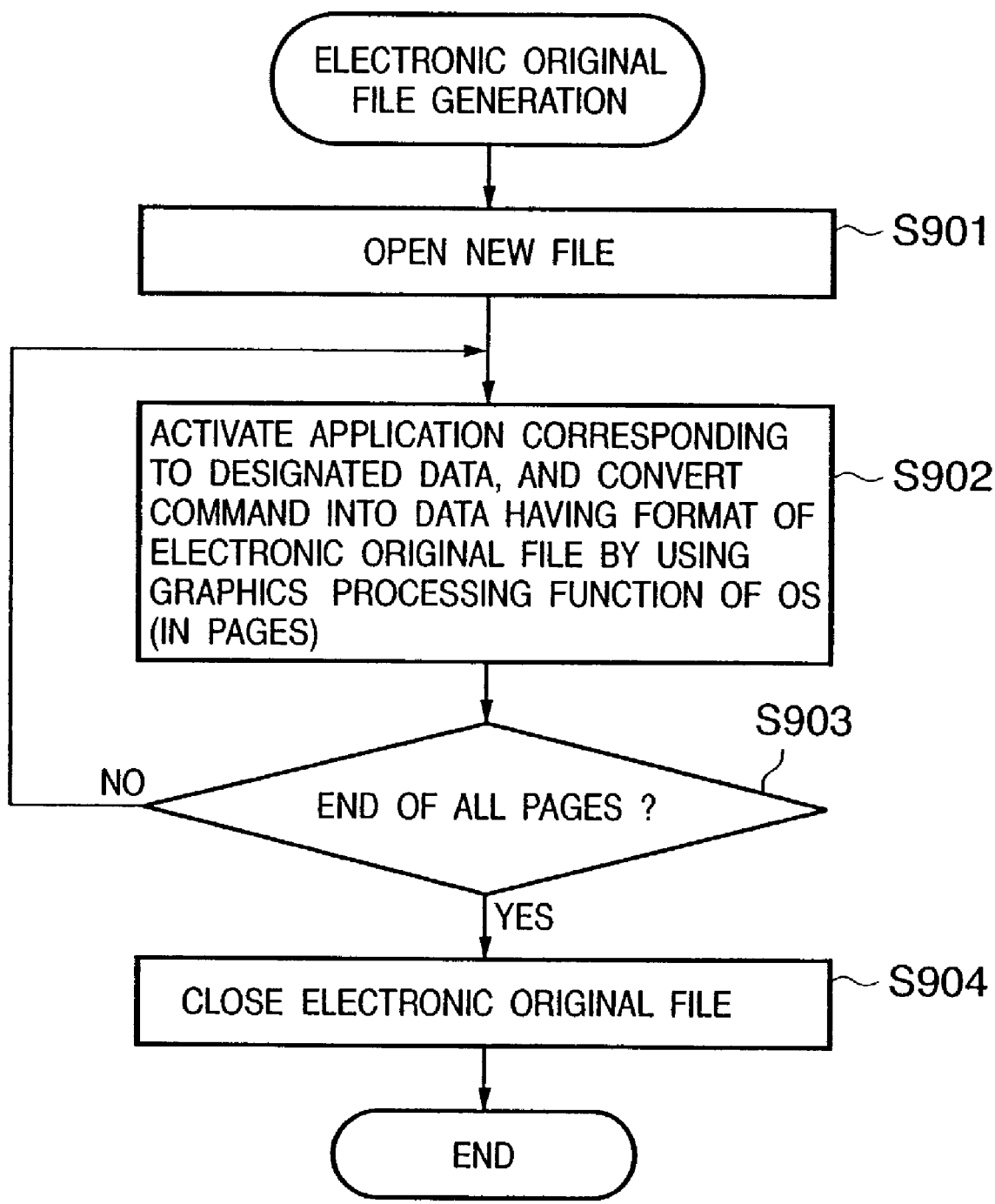
FIG. 9 is a flow chart showing procedures of converting application data into an electronic original file.

FIG. 9 is a flow chart showing procedures of generating an electronic original file by the electronic original writer 102 in step S801 of FIG. 8. A new electronic original file is created and opened (step S901). An application corresponding to designated application data is activated. The electronic original writer is set as a device driver to transmit an output command to the output module of the OS. The output module converts the received output command into data of the electronic original format by the electronic original writer, and outputs the converted data (step S902). The output destination is the electronic original file opened in step S901. Whether all designated data have been converted is checked (step S903), and if YES in step S903, the electronic original file is closed (step S904). The electronic original file generated by the electronic original writer 102 is a file containing original page data entities shown in FIG. 3B.

<Editing of Book File>

As described above, a book file can be created from application data. The generated book file allows editing a chapter and page as follows.
(1) New document
(2) Delete
(3) Copy
(4) Cut
(5) Paste
(6) Move
(7) Change chapter name
(8) Reassign page number/name
(9) Insert cover
(10) Insert slip sheet
(11) Insert index sheet
(12) Page layout of each original page In addition, an operation of canceling executed editing operation, and an operation of restoring canceled operation can be performed. These editing functions enable editing operations such as consolidation of a plurality of book files, rearrangement of chapters and pages within a book file, delete of chapters and pages within a book file, layout change of an original page, and insertion of a slip sheet and index sheet. By these operations, operation results are reflected on attributes shown in FIGS. 4A, 4B and 5 or on a book file structure. For example, a blank page is inserted into a designated portion by an operation of newly adding a blank page. The blank page is processed as an original page. If the layout of an original page is changed, the change contents are reflected on attributes such as the printing method, N-up printing, front/back cover, index sheet, slip sheet, and chaptering.

<Output of Book File>

The ultimate goal of a book file created and edited in the above manner is to print it out. The user selects a file menu from the UI window 1100 of the bookbinding application shown in FIG. 10, and selects printing from this menu. Then, the book file is printed out from a designated output device. At this time, the bookbinding application 104 creates a job ticket from a currently open book file, and transfers the job ticket to the electronic original despooler 105. The electronic original despooler 105 converts the job ticket into an OS output command, e.g., a Windows GDI command, and transmits the command to an output module, e.g., GDI. The output module generates a command complying with a device by a designated printer driver 106, and transmits the command to the device.

The job ticket is data with a structure whose minimum unit is an original page. The structure of the job ticket defines the layout of an original page on paper. One job ticket is issued for one job. A document node is set at the top of the structure, and defines the attribute of the whole document such as double-sided printing/single-sided printing. A paper node belongs to the document node, and contains attributes such as the identifier of paper for use and designation of a feed port in the printer. A node for a sheet printed by the paper belongs to each paper node. One sheet corresponds to one paper sheet. A print page (physical page) belongs to each sheet. One physical page belongs to one sheet for single-sided printing, and two physical pages belong to one sheet for double-sided printing. An original page to be laid out on a physical page belongs to the physical page. The physical page attribute contains an original page layout.

The electronic original despooler 105 converts the job ticket into an output command to the output module.

<Another System Configuration>

The document processing system of this embodiment has generally been described. This system is of stand-alone type. A server-client system as an extension of the stand-alone system also creates and edits a book file by almost the same arrangement and procedures. A book file and print processing are managed by the server.

Figure 12:
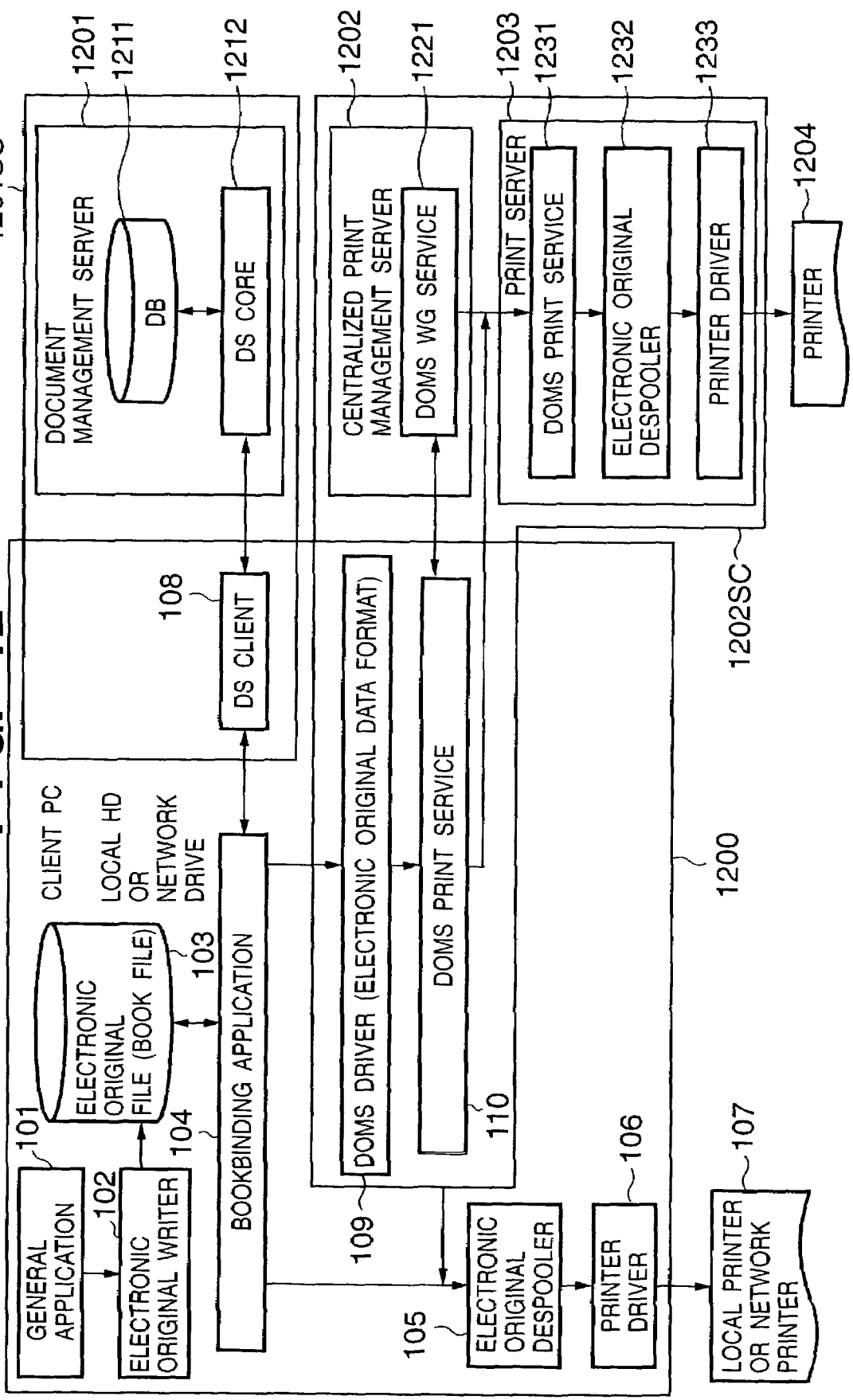
FIG. 12 is a block diagram showing a client-server document processing system.

FIG. 12 is a block diagram showing the arrangement of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, centralized print management server 1202, and print server 1203. These servers are generally connected to the client document processing system via a network. When the servers also function as clients, they are connected by interprocess communication which simulates communication between networks. The document management server 1201 and centralized print management server 1202 are connected to the client in FIG. 12, but only either one may exist on the network. If the connected server is the document management server, a document management server-client system 1201SC including a client module is added to the stand-alone document management system. If the connected server is the centralized print management server 1202, a print management server-client system 1202SC including a client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client module 108 and a DS core 1212.

The centralized print management server 1202 manages printing of a book file stored in the client document processing system 1200 or document management server 1201. A print request from the client is transmitted to a DOMS WG server module 1221 of the centralized print management server 1202 via the DOMS driver 109 and DOMS print service module 110. To print a book file by the printer of the client, the centralized print management server 1202 transfers electronic original data to the electronic original despooler 105 via the DOMS print service module 110 of the client. To print a book file by the print server 1203, the centralized print management server 1202 transmits electronic original data to a DOMS print service module 1231 of the print server 1203. For example, the centralized print management server executes security check on the qualification of a user who has issued a print request for a saved book file, or saves the print processing log. In this fashion, the document processing system can be implemented as both a stand-alone system and client-server system.

<Header and Footer>

As described with reference to FIGS. 4A to 6, the document processing system has a function of synthesizing a header and footer on each page as a book attribute, chapter attribute, or page attribute. The header and footer function to print information such as the creator name, date, or page number accessory to a document on the upper and lower margins of an original page.

Figure 13:
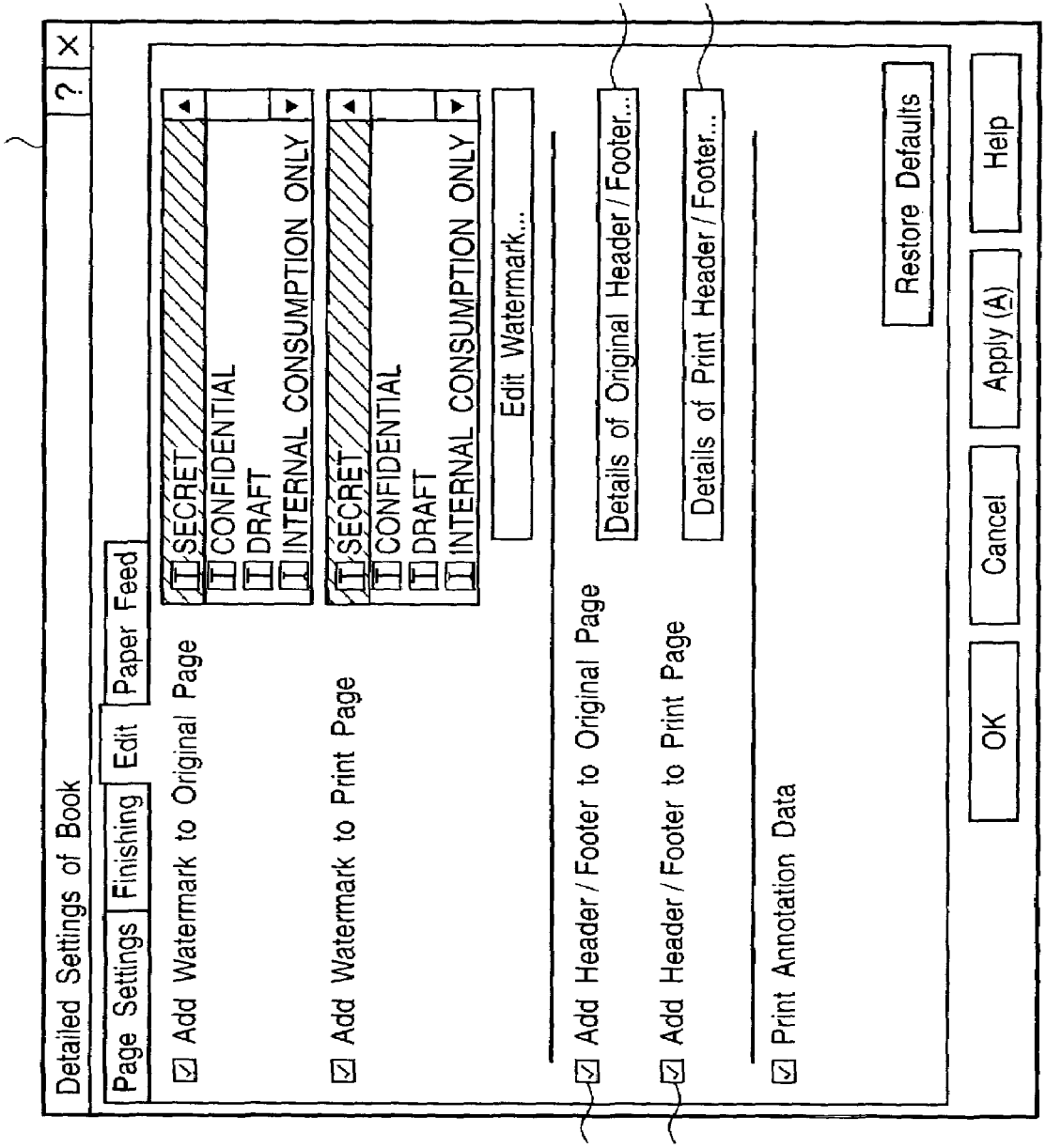
FIG. 13 is a view showing a header/footer setting window for a book.
Figure 20:
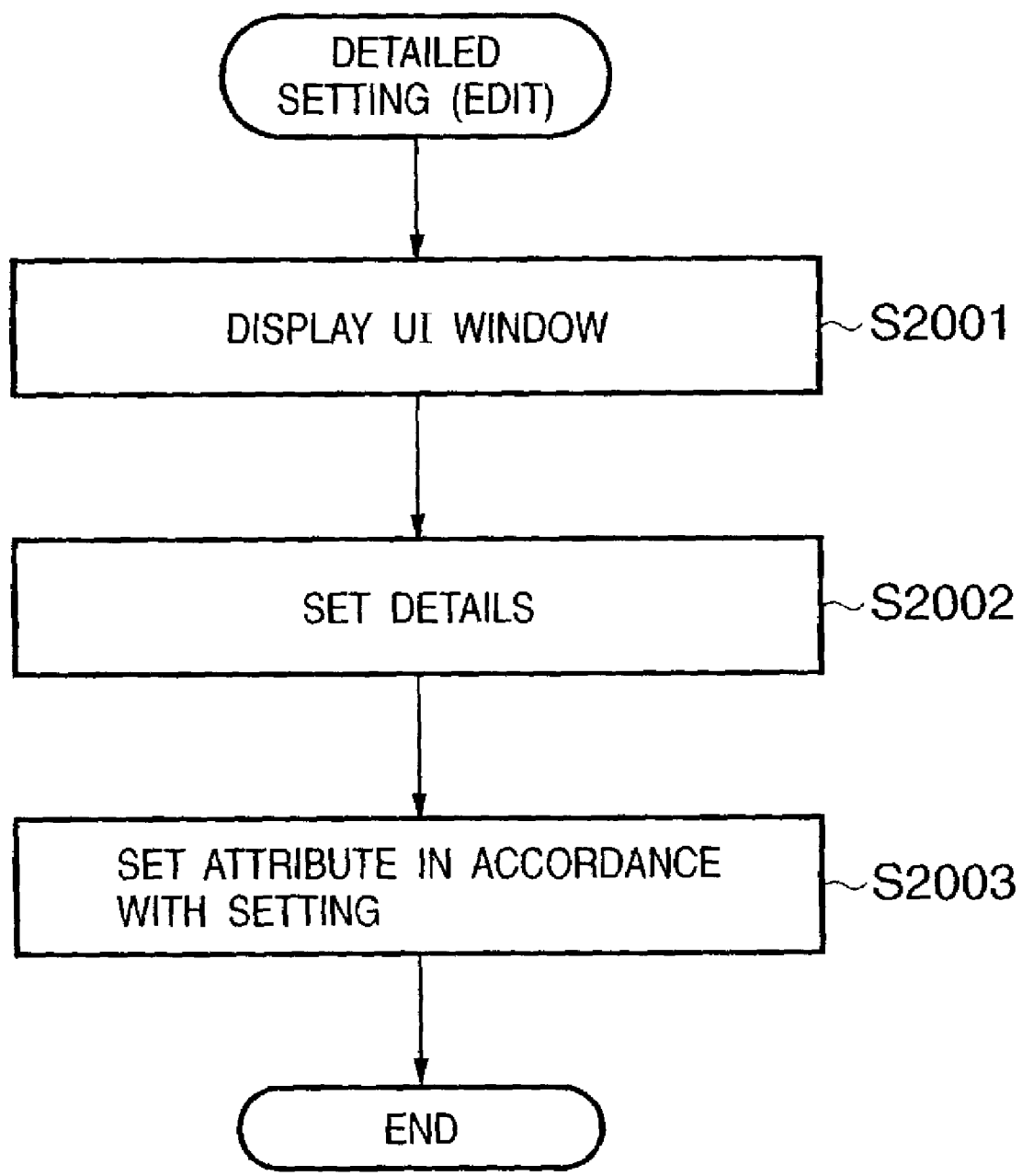
FIG. 20 is a flow chart showing procedures of designating a header/footer.

FIG. 13 shows an example of an "edit" window among detailed setting user interface (UI) windows for a book. A book node is selected from the tree portion 1101 on the window of FIG. 10, and "edit" is selected from the menu column to display the window of FIG. 13. FIG. 20 is a flow chart showing procedures when settings are done on the window of FIG. 13. The procedures in FIG. 20 start when a book node is selected from the tree portion 1101 on the window of FIG. 10 and "edit" is selected from the menu column. In step S2001, a UI window 1300 in FIG. 13 is displayed. In step S2002, the user performs various settings on the window 1300. As for a watermark, settings which can be performed by the user on the window 1300 are editing of a watermark and designation of adding a watermark to each book. Settings in step S2002 will be explained.

A check box 1301 is used to designate addition of a header and footer to an original page. A check box 1302 is used to designate addition of a header and footer to a print page. If addition of a header and footer to a print page is designated, a header and footer are added to a print page even when, e.g., N-up printing is designated and a plurality of original pages are laid out on one print page. If addition of a header and footer to an original page is designated, a designated header and footer are added to each original page. When N-up printing is designated and a plurality of original pages are laid out on one print page, a header and footer are added to each original page on one print page. If a header or footer includes a page number (to be described later), setting of a header/footer means setting of a page number.

Figure 21:
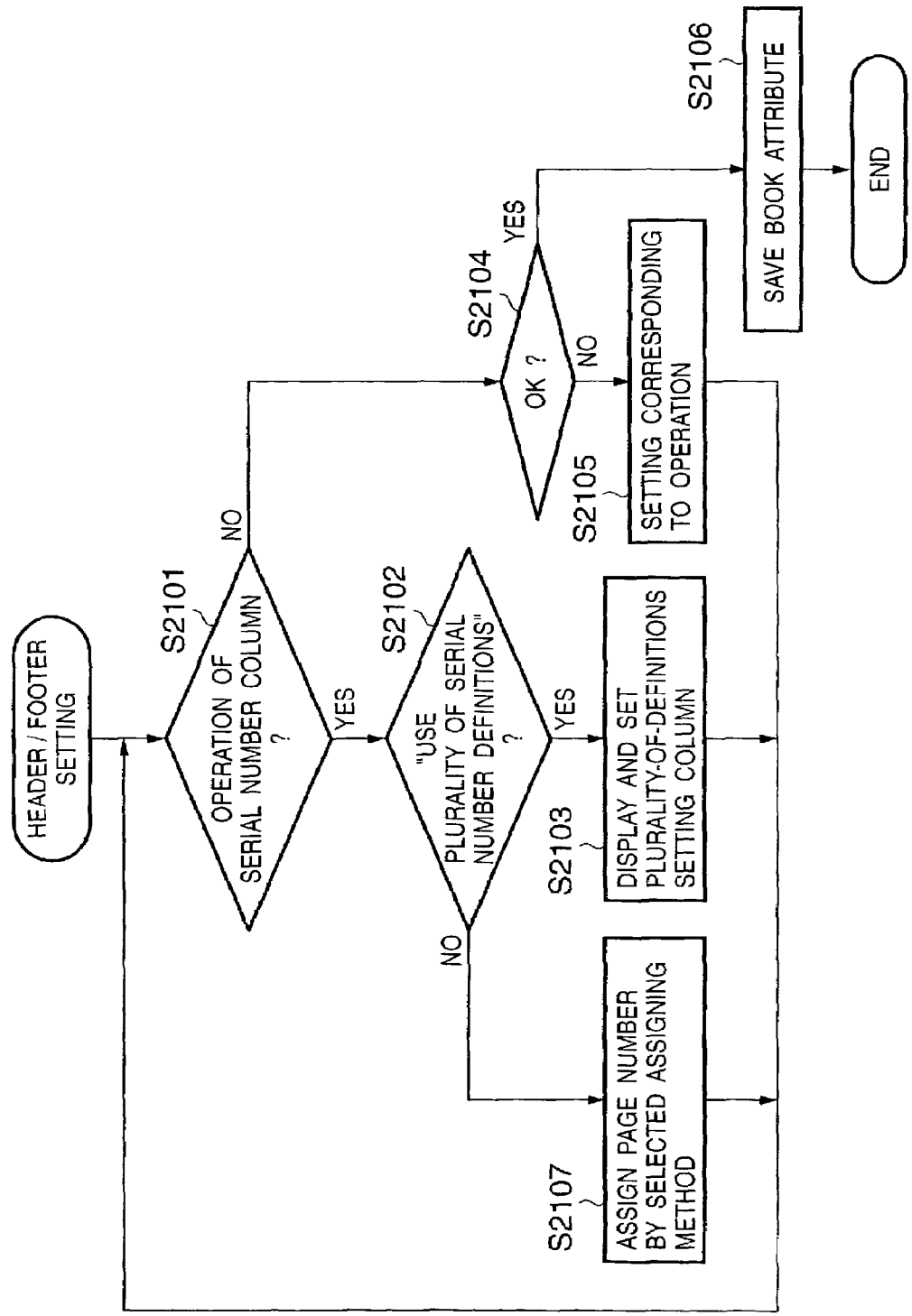
FIG. 21 is a flow chart showing procedures of designating a header/footer.

Details of the header and footer can be set for each original page and each print page. A detailed original header/footer button 1303 and detailed print header/footer button 1304 are buttons for designating details of headers and footers used for original and print pages. By clicking on these buttons 1303 and 1304, a window 1600 in FIG. 16 is displayed. The window of FIG. 16 is used to set details of a print header. This also applies to a footer, and to a header and footer added to an original page. Setting procedures on this window will be explained with reference to FIG. 21. The procedures in FIG. 21 are executed when the detailed original header/footer button 1303 or detailed print header/footer button 1304 on the window of FIG. 13 is clicked to display the UI window 1600 and the user scans the window 1600.

In step S2101, whether the operation is an operation to a serial number column 1601 is checked. The serial number column 1601 is used to designate how to assign a page number. If NO in step S2101, whether the OK button has been clicked is checked in step S2104. If YES in step S2104, the flow branches from step S2104 to step S2106. A header/footer setting operated by the user is set in the header/footer item of the book attribute, and is referred to in printing or displaying a preview window.

Figure 17:
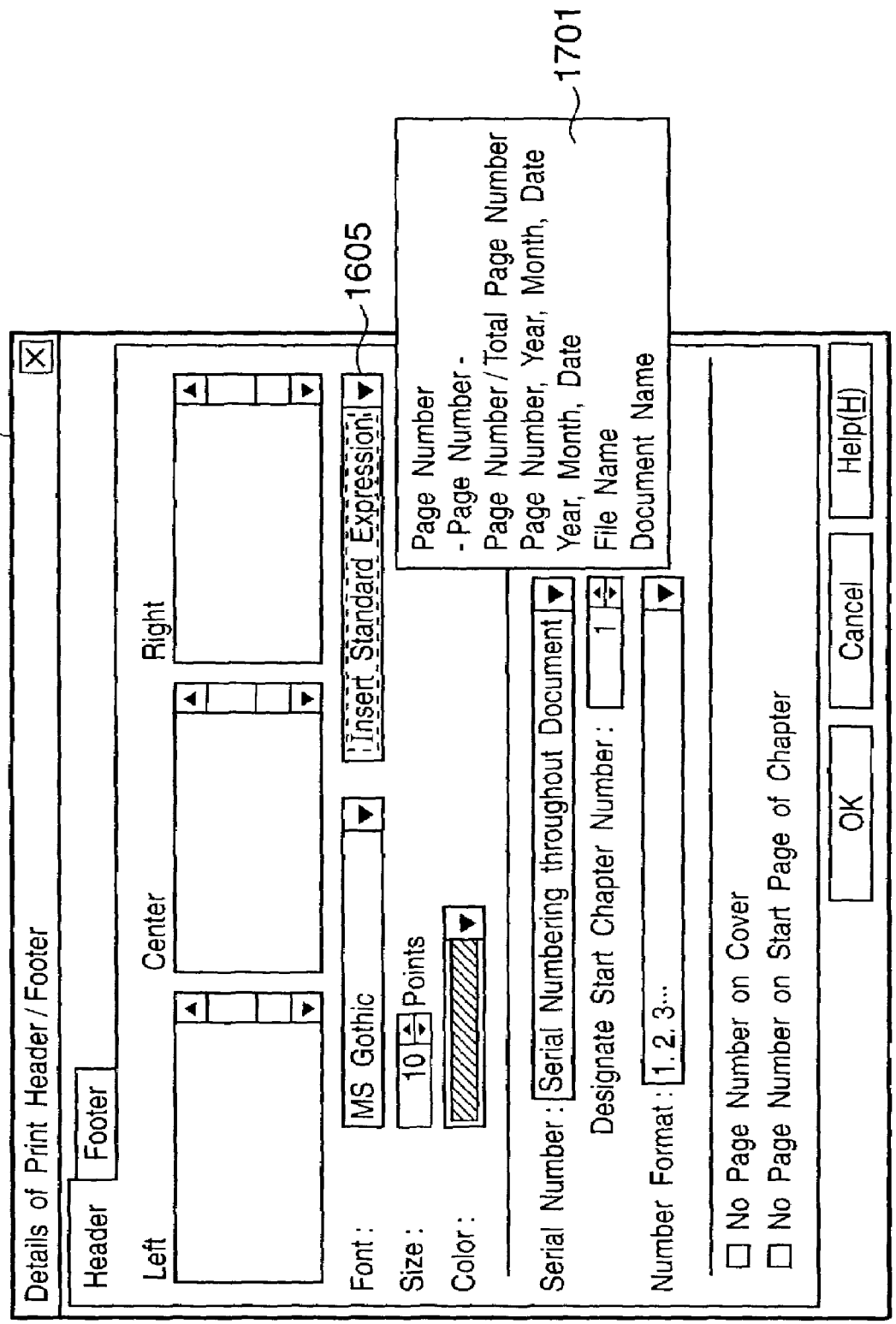
FIG. 17 is a view showing another header/footer editing window.

If NO in step S2104, a setting corresponding to the operation is stored in step S2105. For example, if a standard expression insertion button 1605 is clicked, a standard expression menu is displayed as shown in FIG. 17. The standard expression menu includes page numbers, years/months/days, file names, and document names in several formats. When a page number is selected, a page numbering method is designated in the serial number column 1601. Page numbering can be arbitrarily designated in the serial number column such as a designation 1603 of not assigning the cover with a serial number or a designation 1604 of not page-numbering the first page of a chapter. When "numbering throughout the document" or "designate a start chapter" is designated in the serial number column, a page number in a format designated by a number format column 1602 in FIG. 16 is added to a header/footer. In "designate a start chapter", a start chapter can be designated.

Figure 18:
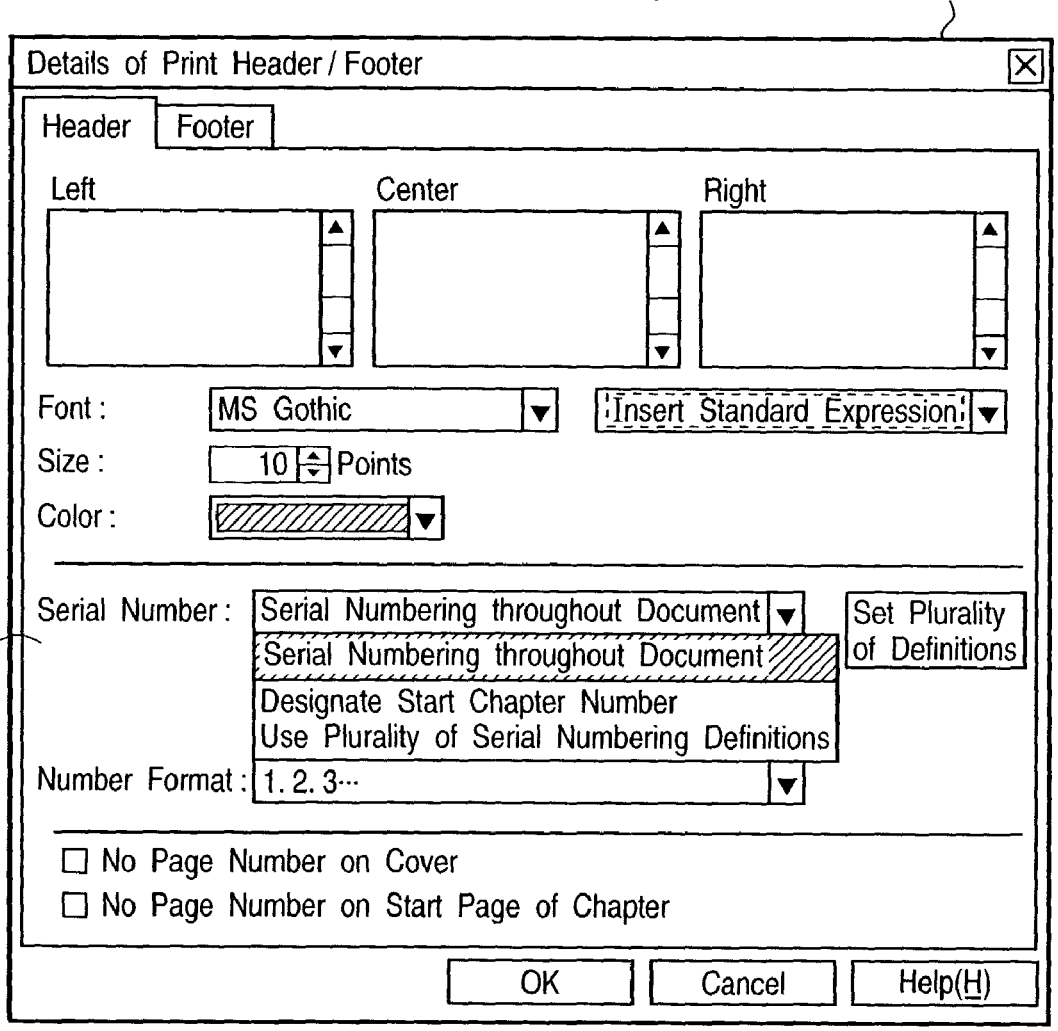
FIG. 18 is a view showing still another header/footer editing window.

If YES in step S2101, a menu is displayed as shown in FIG. 18, and any one of "assign serial numbers throughout the document", "designate a start chapter", and "use a plurality of serial numbers" can be selected. Which of the items has been selected is checked in step S2102.

If an item other than "use a plurality of serial numbers" is selected, the flow advances to step S2107, and a selected setting is stored. If "assign serial numbers throughout the document" is selected, the first to last pages are serially numbered throughout the book. If "designate a start chapter" is selected, a series of page numbers are assigned from the start page of a designated start chapter to the last page of the entire book.

If "use a plurality of serial numbers" is selected, the flow advances to step S2103. In this case, a plurality-of-definitions designation button 1901 for in FIG. 19 becomes active. By clicking on the button 1901, a plurality-of-definitions setting column 1902 is displayed. In the plurality-of-definitions setting column 1902, the entire book file can be sectioned into three at maximum in chapters, and a page numbering method can be designated every section. Check boxes 1903 to 1905 are used to set definitions 1 to 3 of the respective sections active. If this check box is checked, designation of a chapter number in the section and the page number format become effective. A page number is assigned to the footer/header of a print or original page in accordance with the designation. Each section includes a column 1906 for designating a first chapter number, a column 1907 for designating a last chapter number, and a column 1908 for designating the format. These columns allow designating the first chapter number, last chapter number, and format. In the first section (definition 1) in the example of FIG. 19, pages in the first and second chapters are numbered in the format shown in the column 1908. In the second section (definition 2), pages in the third to sixth chapters are numbered in the format shown in the column 1908. In the third section (definition 3), pages in the seventh and eighth chapters are numbered.

With these procedures, a section can be defined at the break of a desired chapter in each book file, and a page number can be assigned every section.

In this embodiment, a book file is sectioned into three at maximum because a general document is comprised of about three sections such as a table of contents, main text, and appendix. The use of this function enables sectioning a book file into, e.g., a table of contents, main text, and appendix, and serially numbering each of them. In addition, the font can also be changed between the table of contents, the main text, and the appendix. The number of sections can also be changed. In this case, the number of sections is designated instead of the check box.

As described above, various settings are done on the UI window 1600. These header/footer settings are completed by clicking the "OK" button on the UI window 1600 in FIG. 16. If step S2002 in FIG. 20 ends, these settings are set in the header/footer item of the book attribute of FIGS. 4A and 4B together with other setting items, and referred to in printing or displaying a preview window.

Figure 14:
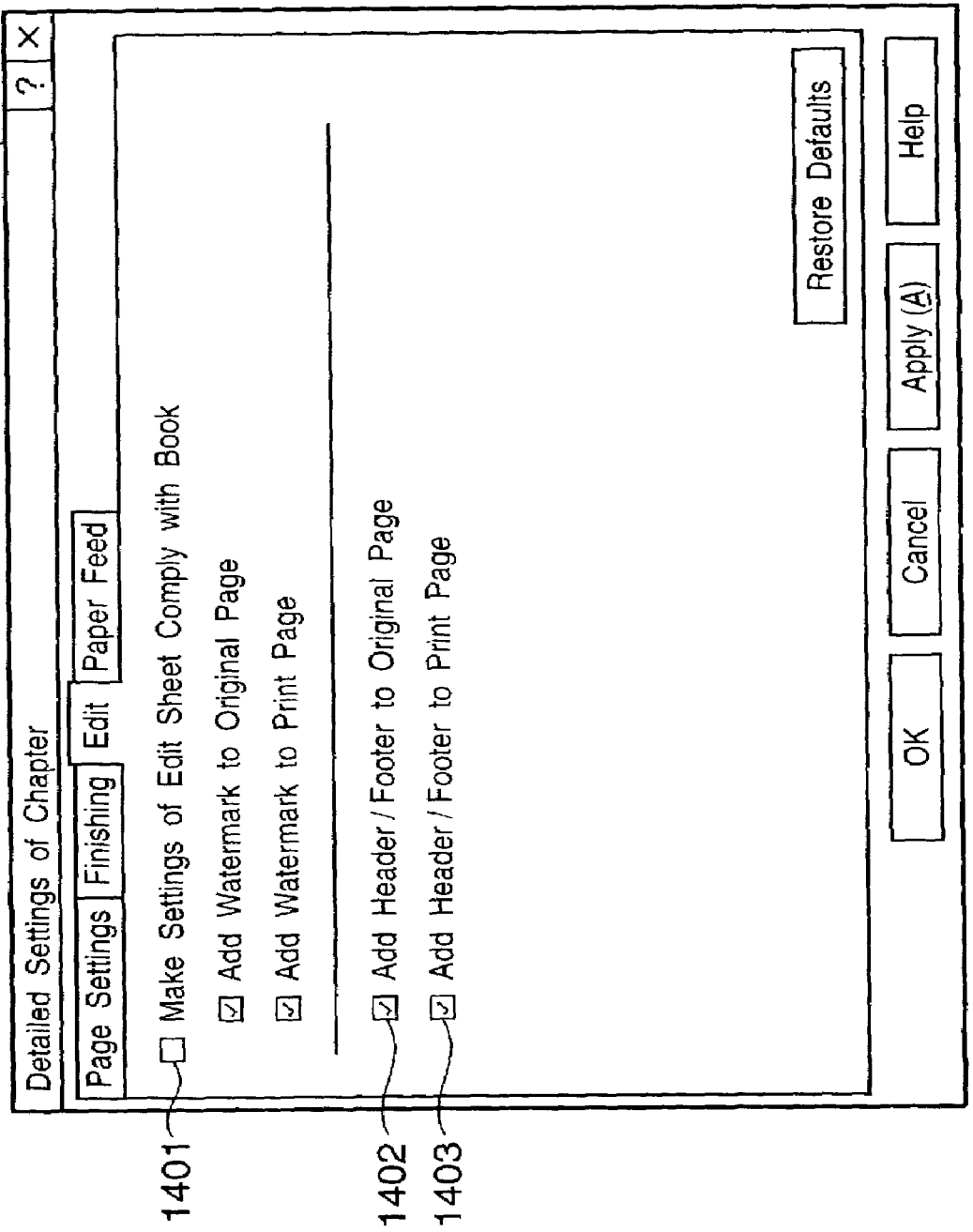
FIG. 14 is a view showing a header/footer setting window for a chapter.

Similar to a book, headers and footers can be set for a chapter and page. FIG. 14 shows an example of an "edit" window among detailed setting user interfaces for a chapter. A chapter node is selected from the tree portion 1101 on the window of FIG. 10, and "edit" is selected from the menu column to display the window of FIG. 14. The window of FIG. 14 includes a check box 1401 for making the contents of the edit sheet of a chapter during editing comply with book settings, a check box 1402 for designating addition of a header/footer to an original page, and a check box 1403 for designating addition of a header/footer to a print page. The edit sheet is the window of FIG. 14. When the check box 1401 is checked, a header/footer designated by the book attribute is applied as for a chapter of interest. When the check box 1402 is checked, a header/footer set by the book attribute is applied to each original page as for a chapter of interest. When the check box 1403 is checked, a watermark set by the book attribute is applied to each print page as for a chapter of interest.

Figure 15:
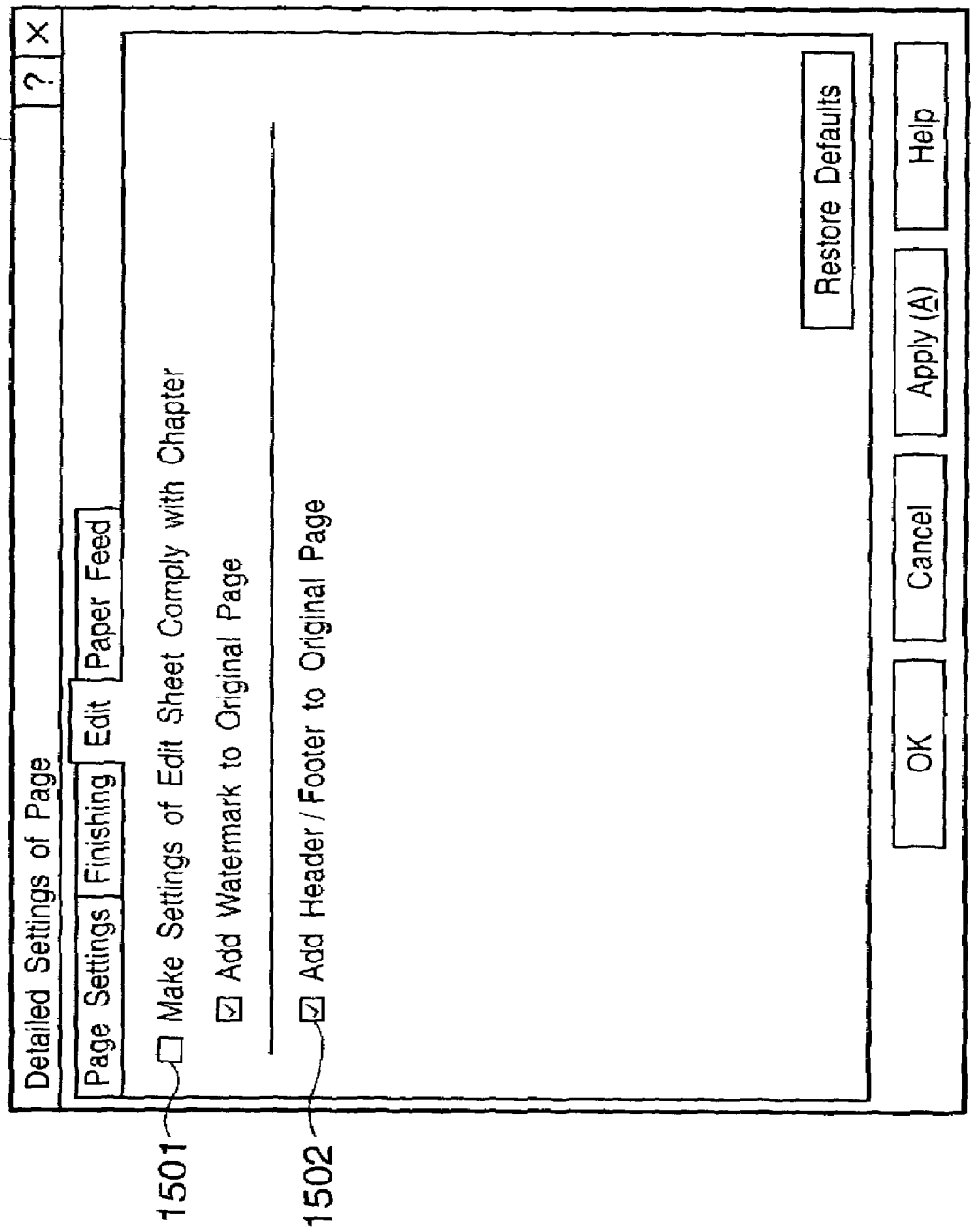
FIG. 15 is a view showing a header/footer setting window for a page.

FIG. 15 shows an example of an "edit" window among detailed setting user interfaces for a page. A page node is selected from the tree portion 1101 on the window of FIG. 10, and "edit" is selected from the menu column to display the window of FIG. 15. The window of FIG. 15 includes a check box 1501 for making the contents of the edit sheet of a page during editing comply with chapter settings, and a check box 1502 for designating addition of a header/footer to an original page. When the check box 1501 is checked, a header/footer designated by the chapter attribute is applied as for a page of interest. When the check box 1502 is checked, a header/footer set by the book attribute is applied to each original page as for a page of interest.

Setting procedures for a chapter and page are the same as those in FIG. 20, and setting contents are set in the header/footer items of the chapter attribute in FIG. 5 and page attribute in FIG. 6

<Display of Preview Window>

A book file assigned a header/footer by the above-described procedures is opened by a bookbinding application to display a preview window as shown in FIG. 10. If the preview window is set in a print view mode, the reduced image of a print page is displayed at the preview portion 1102. A header/footer is also displayed on the image of each print page in accordance with the settings.

<Print>

A preview window directly reduces and displays an image to be printed out. Procedures of generating an image to be printed are the same as those of generating a preview window except that the purpose is to print an image. Owing to the different purpose, generated print data is converted into an output command of a format complying with the output module of the operating system. Thus, the headers/footers of print and original pages are also converted into output commands. Each output command is further converted by the OS into a command interpretable by the printer. The resultant command is transmitted to the printer, and the printer outputs a print page identical to an image displayed on the preview window. This has already been described with reference to FIG. 1.

<Advantages of System of Embodiment>

As described above, the system of this embodiment enables designating a header/footer at each of breaks in one document, and facilitates designating the header/footer.

This system enables creating and editing a document made up of data created by user-desired application programs, and increases the operability and document editing productivity.

As has been described above, according to the present invention, a header/footer can be designated at each of breaks in one document. This designation can be set while a list of sections is displayed, resulting in easy setting and high operability.

A document made up of data created by user-desired application programs can be created and edited, and the operability and document editing productivity can be increased.

As many apparently widely different embodiments of the present invention can be made without departing from the spirit and scope thereof, it is to be understood that the invention is not limited to the specific embodiments thereof except as defined in the appended claims.

What is claimed is:

1. A document processing apparatus for editing document data which has a plurality of chapters, comprising:
   a conversion unit configured to convert drawing data output by an application program into document page data, wherein said conversion unit works as a device driver for the application program;
   a storage unit configured to store the document data which has the plurality of chapters and which is generated from the document page data converted by said conversion unit;
   a layout operation unit configured to accept a page layout setting for a document page of the document data stored by said storage unit, wherein the page layout setting defines that a plurality of document pages of the document data are laid out on a print page that is a side of a sheet;
   a print-page-number addition designating unit configured to accept designation to add a page number to a print page in which a plurality of the document pages of the document data are laid out in accordance with the page layout setting;
   a section designation unit configured to accept designation of a start chapter and an end chapter of each section via a page number setting screen so as to divide the document data stored by said storage unit into a plurality of section, each of the sections including print pages;

a format designation unit configured to accept designation of a format of page numbers to be added to the print pages by each section designated by said section designation unit, the format of page numbers being designated independently for each sections; and a data generation unit configured to generate output data by adding, as page numbers of respective print pages, a sequence of serial numbers in a format designated by said format designation unit to the print pages of each section designated by said designation unit, wherein said data generation unit generates the output data in which a sequence of serial numbers is added to the print pages included in a section independently of the print pages included in another section, and wherein said data generation unit generates output data in which a page number is added to a print page on which the plurality of document pages of the document data are laid out based on the designation designated by said print-page-number addition designating unit.

2. The apparatus according to claim 1, wherein said section designation unit designates three sections at maximum, and said format designation unit designates a font of the page number for each section.

3. The apparatus according to claim 1, wherein said section designation unit sets, in an attribute of an uppermost hierarchical layer of a hierarchical structure, comprising the plurality of chapters designation of adding page numbers to the document pages and the print pages, and sets, in an attribute of a hierarchical layer lower than the uppermost hierarchical layer, whether or not the designation of adding page numbers complies with a setting on an immediately upper hierarchical layer.

4. The apparatus according to claim 3, wherein when the designation of adding page numbers is set in the attribute of the lower hierarchical layer not to comply with the setting on the immediately upper hierarchical layer, said section designation unit designates addition of a page number to each page by using as a unit a set on the hierarchical layer.

5. The apparatus according to claim 1, wherein a hierarchical structure includes a structure comprising the plurality of chapters in which original pages, chapters formed from the original pages, and document data formed from the chapters are sequentially stacked as upper hierarchical layers, and a unit used to section the document includes a chapter.

6. The apparatus according to claim 1, further comprising output unit for outputting each print page formed by image forming unit.

7. The apparatus according to claim 1, further comprising a document page number addition designation unit configured to accept designation to add respective page numbers to document pages, wherein said data generation unit generates the output data in which a page number is added to a print page on which the plurality of document pages are laid out when addition of a page number to a print page is designated by said print page number addition designation unit, and generates the output data in which a page number is added to a document page when addition of a page number to a document page is designated by said document page number addition designation unit.

8. A document processing method for editing document data comprising a plurality of chapters in which a hierarchical structure whose minimum unit is an original page is used, and document data having an attribute set in each hierarchical layer is edited and processed, comprising:

a conversion step of converting drawing data output by an application program into document page data, wherein said conversion step is performed by conversion unit that works as a device driver for the application program;

a storage step of storing the document data which has the plurality of chapters and which is generated from the document page data converted in said conversion step;

a layout operation step of operating a page layout setting for a document page of the document data stored in said storage step, wherein the page layout setting defines that a plurality of document pages of the document data are laid out on a print page that is a side of a sheet;

a print-page-number addition designating step of accepting designation to add a page number to a print page in which a plurality of the document pages of the document data are laid out in accordance with the page layout;

a section designation step of accepting designation of a start chapter and an end chapter of each section via a setting screen so as to divide the document data stored in said storage step into a plurality of sections, each of the sections including print pages;

a format designation step of accepting designation of a format of page numbers to be added to the print pages by each section designated in said section designation step, the format of page numbers being designated independently for each sections; and a data generation step of generating output data by adding, as page numbers of respective print pages, a sequence of serial numbers in a format designated in said format designation step to the print pages of each section designated in said section designation step, wherein said data generation step generates the output data in which a sequence of serial numbers is added to the print pages included in a section independently of the print pages included in another section, wherein in said data generation step output data is generated in which a page number is added to a print page on which the plurality of document pages of the document data are laid out based on the designation in said print-page-number addition designating step.

9. The method according to claim 8, wherein in the section designation step, three sections are designated at maximum, and a font of the page number is designated for each section in said format designation step.

10. The method according to claim 8, wherein in the format designation step, designation of adding page numbers to the original pages and the print pages are set in an attribute of an uppermost hierarchical layer of a hierarchical structure, comprising the plurality of chapters and are set in an attribute of a hierarchical layer lower than the uppermost hierarchical layer set whether or not the designation of adding page numbers complies with a setting on an immediately upper hierarchical layer.

11. The method according to claim 10, wherein in the format designation step, when the designation of adding page numbers is set in the attribute of the lower hierarchical layer not to comply with the setting on the immediately upper hierarchical layer, addition of a page number to each page is designated by using as a unit a set on the hierarchical layer.

12. The method according to claim 8, characterized in that a hierarchical structure comprising the plurality of chapters includes a structure in which original pages, chapters formed from the original pages, and document data formed from the chapters are sequentially stacked as upper hierarchical layers, and a unit used to section the document includes a chapter.

13. The method according to claim 8, further comprising an output step of outputting each print page formed by image forming unit.

14. A computer program embodied in a computer readable storage medium, which causes a computer to edit document data having a hierarchical structure comprising a plurality of chapters, said program comprising computer readable instructions to perform a method comprising:

a conversion step of converting drawing data output by an application program into document page data, wherein said conversion step is performed by conversion unit that works as a device driver for the application program;

a storage step of storing the document data comprising the plurality of chapters and which is generated from the document page data converted in said conversion step;

a layout operation step of operating page layout setting for a document page of the document data stored in said storage step, wherein the page layout setting defines that a plurality of document pages of the document data are laid out on a print page that is a side of a sheet;

a print-page-number addition designating means for designating to add a page number to a print page in which a plurality of the document pages of the document data is laid out in accordance with the page layout setting;

a section designation step of accepting designation of a start chapter and an end chapter of each section via a setting screen so as to divide the document data into a plurality of sections, each of the sections including print pages;

a format designation step of accepting designation a format of serial numbers to be added to the print pages by each section designated in said section designation step, the format of serial numbers being designated independently for each section; and a data generation step of generating output data by adding, as page numbers of respective print pages, a sequence of serial numbers in a format designated in said format designation step to the print pages of each section designated in said section designation step, wherein output data is generated in said data generation step in which a sequence of serial numbers is added to the print pages of a section independently of the print pages included in another section, and wherein output data is generated in said generation step in which a page number is added to a print page on which the plurality of document pages of the document data are laid out based on the designation designated in said print-page-number addition designating step.

* * * * *

UNITED STATES PATENT AND TRADEMARK OFFICE
CERTIFICATE OF CORRECTION

| | |
|---|---|
| PATENT NO. | : 7,281,209 B2 |
| APPLICATION NO. | : 10/241571 |
| DATED | : October 9, 2007 |
| INVENTOR(S) | : Nara et al. |

It is certified that error appears in the above-identified patent and that said Letters Patent is hereby corrected as shown below:

COLUMN 5:
Line 4, "In case" should read -- In the case --.

COLUMN 12:
Line 51, "for in FIG.19" should read -- of FIG. 19 --.

COLUMN 13:
Line 62, "FIG.6" should read -- FIG. 6. --.

COLUMN 15:
Line 2, "of section," should read -- of sections, --;
Line 8, "each sections;" should read -- each section; --;
Line 29, "structure," should read -- structure --;
Line 30, "chapters" should read -- chapters, --;
Line 50, "output" should read -- an output --; and
Line 50, "image" should read -- an image --.

COLUMN 16:
Line 5, "conversion" should read -- a conversion --;
Line 30, "each sections;" should read -- each section; --
Line 53, "structure," should read -- structure --; and
Line 53, "chapters" should read -- chapters, --.

COLUMN 17:
Line 6, "image" should read -- an image --; and
Line 15, "conversion" should read -- a conversion --.

UNITED STATES PATENT AND TRADEMARK OFFICE
CERTIFICATE OF CORRECTION

PATENT NO. : 7,281,209 B2
APPLICATION NO. : 10/241571
DATED : October 9, 2007
INVENTOR(S) : Nara et al.

It is certified that error appears in the above-identified patent and that said Letters Patent is hereby corrected as shown below:

<u>COLUMN 18</u>:
Line 7, "designation" should read -- designation of --.

Signed and Sealed this

Seventeenth Day of June, 2008

JON W. DUDAS
*Director of the United States Patent and Trademark Office*